United States Patent
Lee et al.

(10) Patent No.: US 10,761,330 B2
(45) Date of Patent: Sep. 1, 2020

(54) RAINBOW REDUCTION IN WAVEGUIDE DISPLAYS

(71) Applicant: Facebook Technologies, LLC, Menlo Park, CA (US)

(72) Inventors: Hee Yoon Lee, Kirkland, WA (US); Ningfeng Huang, Redmond, WA (US); Eric Fest, Seattle, WA (US); Pasi Saarikko, Kirkland, WA (US); Erik Shipton, Kenmore, WA (US); Giuseppe Calafiore, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/209,719

(22) Filed: Dec. 4, 2018

(65) Prior Publication Data

US 2019/0227321 A1 Jul. 25, 2019

Related U.S. Application Data

(63) Continuation-in-part of application No. 16/054,867, filed on Aug. 3, 2018, and a continuation-in-part of application No. 15/878,287, filed on Jan. 23, 2018.

(51) Int. Cl.
*G02B 5/18* (2006.01)
*G02B 27/01* (2006.01)
(Continued)

(52) U.S. Cl.
CPC ........... *G02B 27/0172* (2013.01); *G02B 5/18* (2013.01); *G02B 5/1809* (2013.01); *G02B 5/22* (2013.01);
(Continued)

(58) Field of Classification Search
CPC .. G02B 5/1852; G02B 5/1857; G02B 6/0016; G02B 6/0038; G02B 2027/012;
(Continued)

(56) References Cited

U.S. PATENT DOCUMENTS

| 4,856,869 A | * | 8/1989 | Sakata | ............... G02B 5/1842 349/201 |
|---|---|---|---|---|
| 6,285,813 B1 | * | 9/2001 | Schultz | ................. G02B 6/124 359/575 |

(Continued)

FOREIGN PATENT DOCUMENTS

| EP | 1183684 B1 | 6/2008 |
|---|---|---|
| KR | 19980050572 A | 9/1998 |

OTHER PUBLICATIONS

Miller, et al., "Design and Fabrication of Binary Slanted Surface-Relief Gratings for a Planar Optical Interconnection", Applied Optics, vol. 36, No. 23, Aug. 10, 1997, pp. 5717-5727.

(Continued)

*Primary Examiner* — William R Alexander
*Assistant Examiner* — Balram T Parbadia
(74) *Attorney, Agent, or Firm* — Kilpatrick Townsend & Stockton LLP

(57) ABSTRACT

A waveguide display includes a first substrate and one or more grating layers on a first surface of the first substrate. The one or more grating layers are configured to cause destructive interference between ambient light diffracted by at least two grating layers or between ambient light diffracted by different portions of one grating layer. In some embodiments, the waveguide display also includes an angular-selective transmissive layer. The angular-selective transmissive layer is configured to reflect, diffract, or absorb ambient light incident on the angular-selective reflective layer with an incidence angle greater than a threshold value.

21 Claims, 22 Drawing Sheets

(51) Int. Cl.
*F21V 8/00* (2006.01)
*G02B 5/22* (2006.01)

(52) U.S. Cl.
CPC ......... *G02B 6/005* (2013.01); *G02B 27/0101* (2013.01); *G02B 2005/1804* (2013.01); *G02B 2027/012* (2013.01); *G02B 2027/0178* (2013.01)

(58) Field of Classification Search
CPC .... G02B 2027/0125; G02B 2027/0178; G02B 27/01; G02B 5/18; G02B 27/44; F21V 8/00
See application file for complete search history.

(56) References Cited

U.S. PATENT DOCUMENTS

| | | | |
|---|---|---|---|
| 9,360,615 B1* | 6/2016 | Jalava | G02B 6/34 |
| 9,519,089 B1 | 12/2016 | Brown et al. | |
| 2005/0211547 A1 | 9/2005 | Hanawa et al. | |
| 2005/0277063 A1 | 12/2005 | Wang et al. | |
| 2006/0001972 A1* | 1/2006 | Sato | G01J 3/18 |
| | | | 359/569 |
| 2006/0045987 A1 | 3/2006 | Chandler et al. | |
| 2007/0159673 A1* | 7/2007 | Freeman | G02B 27/145 |
| | | | 359/19 |
| 2009/0074356 A1 | 3/2009 | Sanchez et al. | |
| 2009/0097122 A1* | 4/2009 | Niv | G02B 5/32 |
| | | | 359/575 |
| 2009/0224416 A1* | 9/2009 | Laakkonen | B82Y 40/00 |
| | | | 264/1.38 |
| 2010/0079865 A1* | 4/2010 | Saarikko | G02B 27/0172 |
| | | | 359/566 |
| 2011/0038049 A1* | 2/2011 | Vallius | G02B 5/1809 |
| | | | 359/575 |
| 2011/0242635 A1* | 10/2011 | Oka | G02B 27/0172 |
| | | | 359/207.7 |
| 2011/0279818 A1* | 11/2011 | Amako | G01J 3/44 |
| | | | 356/328 |
| 2012/0062998 A1* | 3/2012 | Schultz | B29D 11/00663 |
| | | | 359/630 |
| 2013/0100362 A1* | 4/2013 | Saeedi | G02B 5/30 |
| | | | 349/11 |
| 2013/0192758 A1 | 8/2013 | Toth et al. | |
| 2014/0085725 A1 | 3/2014 | Lochbihler et al. | |
| 2015/0125976 A1 | 5/2015 | Wang | |
| 2015/0253570 A1* | 9/2015 | Sunnari | G02B 5/1809 |
| | | | 359/576 |
| 2015/0279686 A1 | 10/2015 | Kuo et al. | |
| 2016/0018639 A1* | 1/2016 | Spitzer | G02B 5/3083 |
| | | | 345/156 |
| 2016/0033784 A1 | 2/2016 | Levola et al. | |
| 2016/0035539 A1 | 2/2016 | Sainiemi et al. | |
| 2016/0042971 A1 | 2/2016 | Mohanty | |
| 2016/0231567 A1 | 8/2016 | Saarikko et al. | |
| 2016/0301188 A1* | 10/2016 | Mathai | H01L 31/02327 |
| 2016/0357016 A1* | 12/2016 | Cakmakci | H04N 5/33 |
| 2017/0010465 A1* | 1/2017 | Martinez | G02B 27/0172 |
| 2017/0059879 A1 | 3/2017 | Vallius | |
| 2017/0236463 A1 | 8/2017 | Chi et al. | |
| 2017/0311430 A1 | 10/2017 | Liang et al. | |
| 2017/0315356 A1 | 11/2017 | Tervo | |
| 2017/0357101 A1 | 12/2017 | Tervo et al. | |
| 2018/0081176 A1* | 3/2018 | Olkkonen | G02B 27/0172 |

OTHER PUBLICATIONS

International Application No. PCT/US2018/036515, "International Search Report and Written Opinion", dated Sep. 27, 2018, 15 pages.
International Application No. PCT/US2019/014075, "International Search Report and Written Opinion", dated May 8, 2019, 11 pages.
U.S. Appl. No. 16/054,867, Non-Final Office Action dated Mar. 16, 2020, 8 pages.
International Application No. PCT/US2018/058272, "International Search Report and Written Opinion," dated Mar. 11, 2019, 14 pages.
U.S. Appl. No. 15/878,287, "Non-Final Office Action", dated Oct. 17, 2019, 19 pages.
EP19153308.2, "Extended European Search Report", dated Oct. 16, 2019, 10 pages.

* cited by examiner

RAINBOW REDUCTION IN WAVEGUIDE DISPLAYS

CROSS-REFERENCE TO RELATED APPLICATION

This patent application is a continuation-in-part of U.S. patent application Ser. No. 15/878,287, filed Jan. 23, 2018, entitled "SLANTED SURFACE RELIEF GRATING FOR RAINBOW REDUCTION IN WAVEGUIDE DISPLAY," and U.S. patent application Ser. No. 16/054,867, filed Aug. 3, 2018, entitled "RAINBOW REDUCTION FOR WAVEGUIDE DISPLAYS," both of which are herein incorporated by reference in their entireties for all purposes.

BACKGROUND

An artificial reality system, such as a head-mounted display (HMD) or heads-up display (HUD) system, generally includes a display configured to present artificial images that depict objects in a virtual environment. The display may display virtual objects or combine real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through).

One example optical see-through AR system may use a waveguide-based optical display, where light of projected images may be coupled into a waveguide (e.g., a substrate), propagate within the waveguide, and be coupled out of the waveguide at different locations. In some implementations, the light may be coupled out of the waveguide using a diffractive optical element, such as a grating. The grating may diffract both the light of the projected image and light from the surrounding environment (e.g., from a light source, such as a lamp). The diffracted light from the surrounding environment may appear as a ghost image to the user of the AR system. In addition, due to the wavelength dependent characteristics of the grating, ghost images of different colors may appear at different locations or angles. These ghost images may negatively impact the user experience of using an artificial reality system.

SUMMARY

This disclosure relates generally to near-eye display systems, and more specifically to near-eye displays with reduced glare or ghost images. In one embodiment, a waveguide-based near-eye display includes diffraction grating couplers with reduced artifacts (e.g., ghost images and chromatic dispersion) for ambient light. The grating couplers are configured to diffractively couple display light out of a waveguide and refractively transmit ambient light through the waveguide. The grating couplers may include one or more grating layers that are configured to cause destructive interference between ambient light diffracted by at least two grating layers or between ambient light diffracted by different portions of a slanted grating layer. An angular-selective transmissive layer may be placed in front of (or behind) the waveguide to further reduce the artifacts caused by external light source. The angular-selective transmissive layer may be configured to block (e.g., reflect, diffract, or absorb) ambient light with an incident angle greater than one half of the see-through field of view of the near-eye display, while allowing (e.g., refracting) ambient light within the see-through field of view of the near-eye display to pass through and reach user's eyes with little or no loss.

In some embodiments, a waveguide display may include a first substrate and one or more grating layers on a first surface of the first substrate. The one or more grating layers may be configured to cause destructive interference between ambient light diffracted by at least two grating layers or between ambient light diffracted by different portions of one grating layer. In some embodiments, the one or more grating layers may include a slanted grating including a plurality of slanted ridges, the slanted grating characterized by a height, a period, and a slant angle of the plurality of slanted ridges configured to cause destructive interference between ambient light diffracted by different portions of the slanted grating. In some embodiments, the one or more grating layers may include at least two grating layers, where the at least two grating layers are characterized by a same grating period and are offset by a half of the grating period.

In some embodiments, the waveguide display may also include an angular-selective transmissive layer. The angular-selective transmissive layer may be configured to reflect, diffract, or absorb ambient light incident on the angular-selective transmissive layer with an incidence angle greater than a threshold value. In some embodiments, the angular-selective transmissive layer may include a plurality of regions, where each region may be characterized by a different respective angular selectivity, such as a different angular selective threshold value. In some embodiments, each region of the angular-selective transmissive layer may have an anisotropic angular selective characteristic. In some embodiments, the angular-selective transmissive layer may be on a second surface of the first substrate that is opposite to the first surface. In some embodiments, the angular-selective transmissive layer may be on a surface of a second substrate.

In some embodiments of the waveguide display, the angular-selective transmissive layer may include a plurality of absorptive or reflective layers arranged in a stack, a layer of subwavelength structures, a grating layer with a subwavelength grating period (e.g., configured to diffract ambient light having a large incident angle out of the eyebox), or a microlouver layer. In some embodiments, the waveguide display may be characterized by a see-through field of view, and the threshold value may be equal to or greater than a half of the see-through field of view. In some embodiments, the threshold value is greater than 60°. In some embodiments, a reflectivity, diffraction efficiency, or absorptivity of the angular-selective transmissive layer for ambient light with the incidence angle greater than the threshold value is greater than 90%.

In some embodiments, a near-eye display may include a waveguide, an input coupler configured to couple display light from an image source into the waveguide, and an output coupler coupled to the waveguide. The output coupler may be configured to refractively transmit ambient light from an environment in front of the near-eye display, and diffractively couple the display light out of the waveguide. The output coupler may include one or more grating layers and may be configured to cause destructive interference between ambient light diffracted by at least two grating layers or between ambient light diffracted by different portions of one grating layer. In some embodiments, the one or more grating layers may include a slanted grating including a plurality of slanted ridges, the slanted grating characterized by a height, a period, and a slant angle of the plurality of slanted ridges configured to cause destructive interference between ambient light diffracted by different portions of the slanted grating. In some embodiments, the one or more grating layers may include at least two grating layers, where the at least two grating layers are characterized by a same grating period and are offset by a half of the grating period.

In some embodiments, the near-eye display may also include an angular-selective transmissive layer. The angular-selective transmissive layer may be configured to reflect, diffract, or absorb ambient light incident on the angular-selective transmissive layer with an incidence angle greater than a threshold value. In some embodiments, the angular-selective transmissive layer may be on a surface of the waveguide. In some embodiments, the angular-selective transmissive layer may be on a surface of a substrate. In some embodiments of the near-eye display, the angular-selective transmissive layer may include a plurality of absorptive or reflective layers arranged in a stack, a layer of subwavelength structures, a grating layer with a subwavelength grating period, or a microlouver layer. In some embodiments, the near-eye display may be characterized by a see-through field of view, and the threshold value may be equal to or greater than a half of the see-through field of view. In some embodiments, the threshold value is greater than 60°. In some embodiments, a reflectivity, diffraction efficiency, or absorptivity of the angular-selective transmissive layer for ambient light with the incidence angle greater than the threshold value is greater than 90%.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

Figure 1:
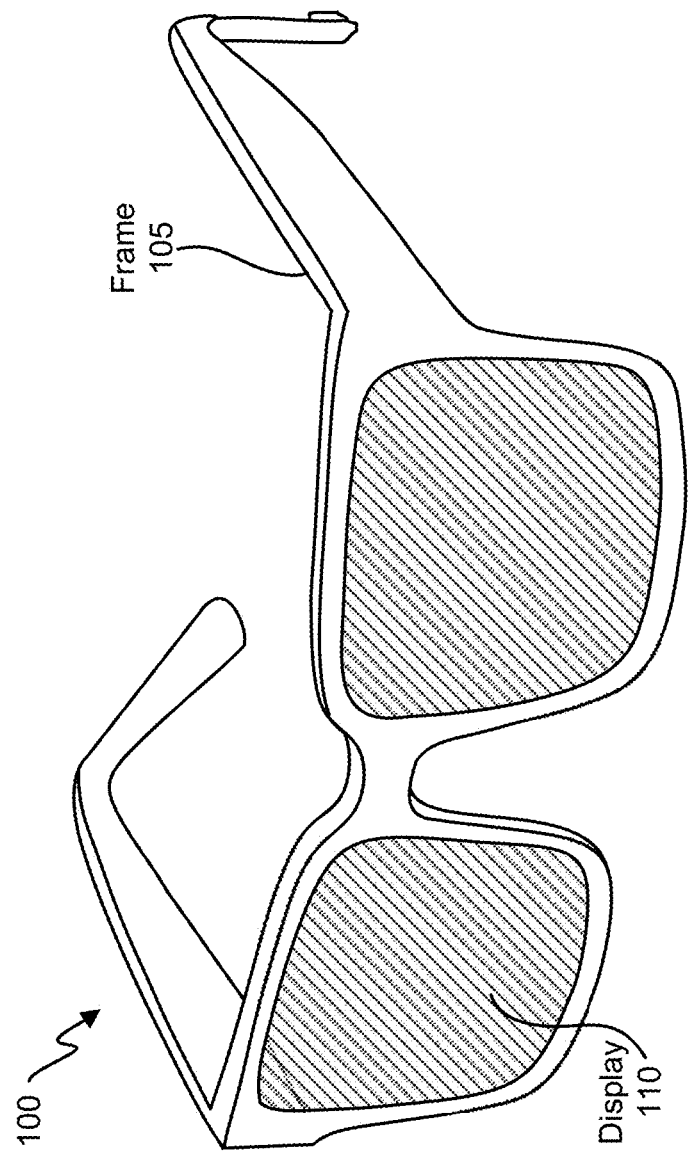
FIG. 1 is a simplified diagram of an example near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques disclosed herein relate generally to near-eye display systems, and more specifically to near-eye displays with reduced glare or ghost images. According to certain embodiments, a waveguide-based near-eye display may include diffraction grating couplers with reduced artifacts (e.g., ghost images and chromatic dispersion) for external light. For example, in some embodiments, a slanted grating including a plurality of slanted ridges may be used as the grating coupler for coupling display light of artificial objects out of a waveguide of the waveguide-based near-eye display and for transmitting environmental light from real objects through the waveguide. The height of the slanted ridges may be equal to or close to an integer multiple of the period of the slanted grating divided by the tangent of the slant angle of the slanted ridges, such that ambient light diffracted by different portions of the slanted grating may destructively interfere to reduce the diffraction of the ambient light. In some embodiments, the grating coupler may include at least two grating layers, where ambient light diffracted by the two or more grating layers may destructively interfere to reduce the diffraction of the ambient light.

In some implementations, an angular-selective transmissive layer may be placed in front of (or behind) the waveguide and the grating coupler of the waveguide-based near-eye display to further reduce the artifacts caused by external light source. The angular-selective transmissive layer may be configured to reflect, diffract, or absorb ambient light with an incident angle greater than one half of the see-through field of view of the near-eye display, while allowing ambient light within the see-through field of view of the near-eye display to pass through and reach user's eyes with little or no loss.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof.

FIG. 1 is a simplified diagram of an example near-eye display 100 according to certain embodiments. Near-eye display 100 may present media to a user. Examples of media presented by near-eye display 100 may include one or more images, video, and/or audio. In some embodiments, audio may be presented via an external device (e.g., speakers and/or headphones) that receives audio information from near-eye display 100, a console, or both, and presents audio data based on the audio information. Near-eye display 100 is generally configured to operate as an artificial reality display. In some embodiments, near-eye display 100 may operate as an augmented reality (AR) display or a mixed reality (MR) display.

Near-eye display 100 may include a frame 105 and a display 110. Frame 105 may be coupled to one or more optical elements. Display 110 may be configured for the user to see content presented by near-eye display 100. In some embodiments, display 110 may include a waveguide display assembly for directing light from one or more images to an eye of the user.

Figure 2:
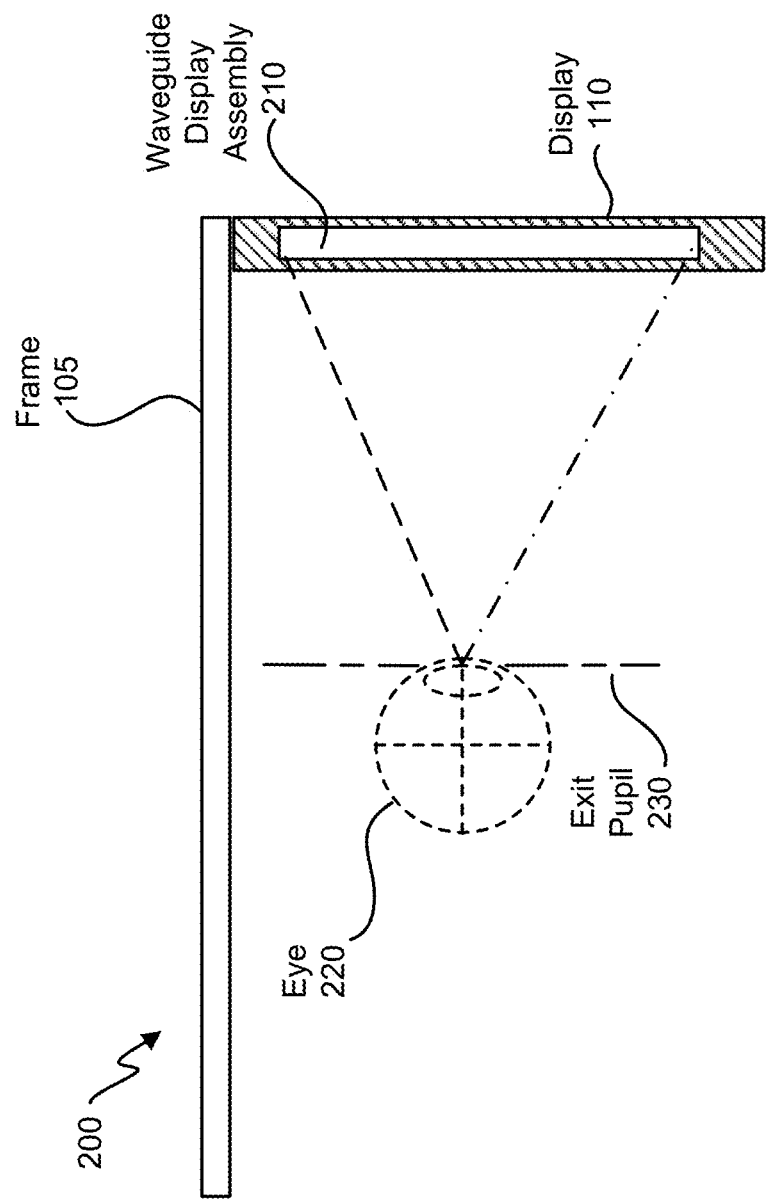
FIG. 2 is a cross-sectional view of an example near-eye display according to certain embodiments.

FIG. 2 is a cross-sectional view 200 of near-eye display 100 illustrated in FIG. 1. Display 110 may include may include at least one waveguide display assembly 210. An exit pupil 230 may be located at a location where a user's eye 220 is positioned when the user wears near-eye display 100. For purposes of illustration, FIG. 2 shows cross-section sectional view 200 associated with user's eye 220 and a single waveguide display assembly 210, but, in some embodiments, a second waveguide display may be used for the second eye of the user.

Waveguide display assembly 210 may be configured to direct image light (i.e., display light) to an eyebox located at exit pupil 230 and to user's eye 220. Waveguide display assembly 210 may include one or more materials (e.g., plastic, glass, etc.) with one or more refractive indices. In some embodiments, near-eye display 100 may include one or more optical elements between waveguide display assembly 210 and user's eye 220.

In some embodiments, waveguide display assembly 210 may include a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display may also be a polychromatic display that can be projected on multiple planes (e.g. multi-planar colored display). In some configurations, the stacked waveguide display may be a monochromatic display that can be projected on multiple planes (e.g. multi-planar monochromatic display). The varifocal waveguide display is a display that can adjust a focal position of image light emitted from the waveguide display. In alternate embodiments, waveguide display assembly 210 may include the stacked waveguide display and the varifocal waveguide display.

Figure 3:
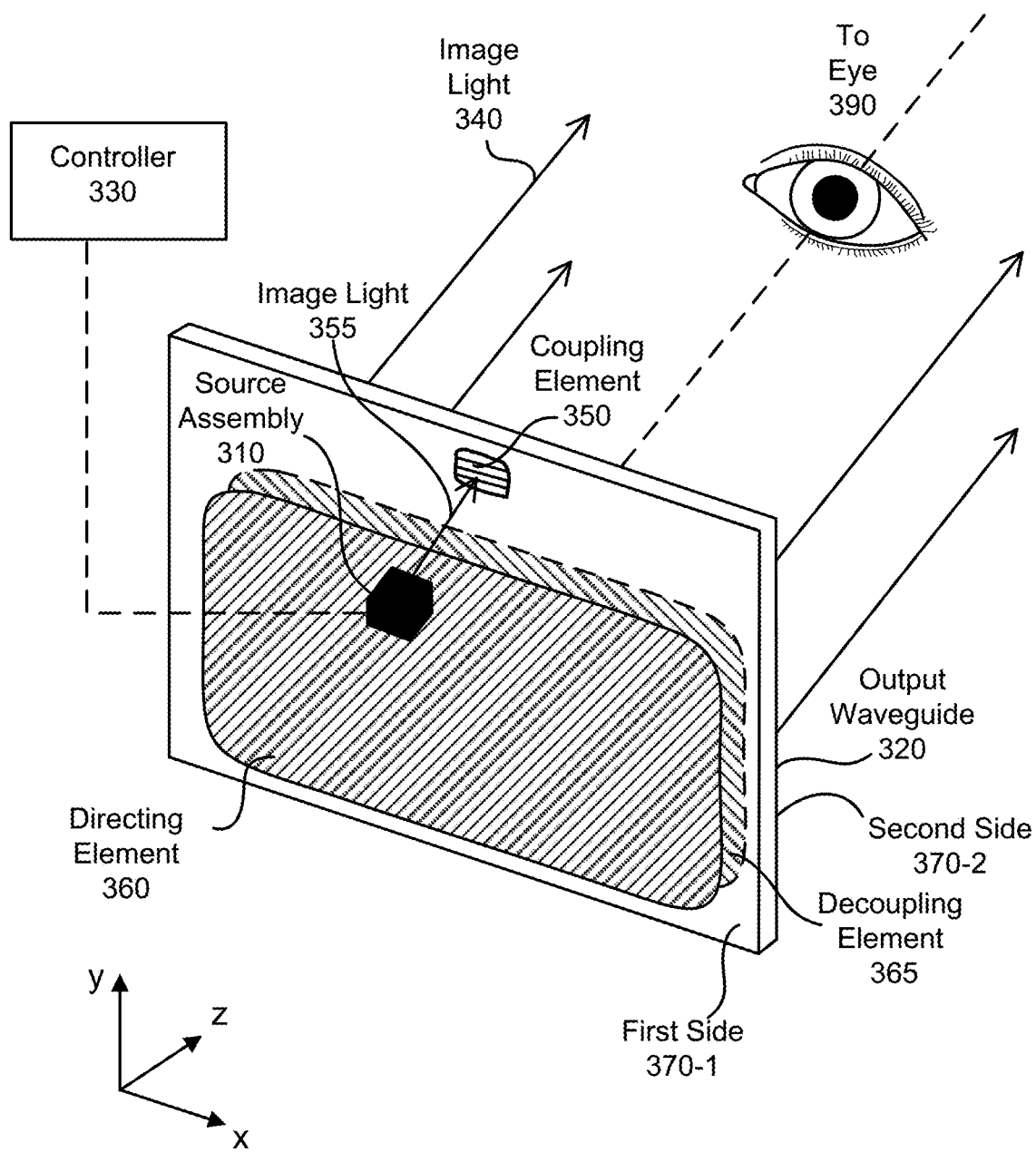
FIG. 3 is an isometric view of an example waveguide display according to certain embodiments.

FIG. 3 is an isometric view of an embodiment of a waveguide display 300. In some embodiments, waveguide display 300 may be a component (e.g., waveguide display assembly 210) of near-eye display 100. In some embodiments, waveguide display 300 may be part of some other near-eye displays or other systems that may direct image light to a particular location.

Waveguide display 300 may include a source assembly 310, an output waveguide 320, and a controller 330. For purposes of illustration, FIG. 3 shows waveguide display 300 associated with a user's eye 390, but in some embodiments, another waveguide display separate, or partially separate, from waveguide display 300 may provide image light to another eye of the user.

Source assembly 310 may generate image light 355 for display to the user. Source assembly 310 may generate and output image light 355 to a coupling element 350 located on a first side 370-1 of output waveguide 320. In some embodiments, coupling element 350 may couple image light 355 from source assembly 310 into output waveguide 320. Coupling element 350 may include, for example, a diffraction grating, a holographic grating, one or more cascaded reflectors, one or more prismatic surface elements, and/or an array of holographic reflectors. Output waveguide 320 may be an optical waveguide that can output expanded image light 340 to user's eye 390. Output waveguide 320 may receive image light 355 at one or more coupling elements 350 located on first side 370-1 and guide received image light 355 to a directing element 360.

Directing element 360 may redirect received input image light 355 to decoupling element 365 such that received input image light 355 may be coupled out of output waveguide 320 via decoupling element 365. Directing element 360 may be part of, or affixed to, first side 370-1 of output waveguide 320. Decoupling element 365 may be part of, or affixed to, a second side 370-2 of output waveguide 320, such that directing element 360 is opposed to decoupling element 365. Directing element 360 and/or decoupling element 365 may include, for example, a diffraction grating, a holographic grating, a surface-relief grating, one or more cascaded reflectors, one or more prismatic surface elements, and/or an array of holographic reflectors.

Second side 370-2 of output waveguide 320 may represent a plane along an x-dimension and a y-dimension. Output waveguide 320 may include one or more materials that can facilitate total internal reflection of image light 355. Output waveguide 320 may include, for example, silicon, plastic, glass, and/or polymers. Output waveguide 320 may have a relatively small form factor. For example, output waveguide 320 may be approximately 50 mm wide along the x-dimension, about 30 mm long along the y-dimension, and about 0.5 to 1 mm thick along a z-dimension.

Controller 330 may control scanning operations of source assembly 310. Controller 330 may determine scanning instructions for source assembly 310. In some embodiments, output waveguide 320 may output expanded image light 340 to user's eye 390 with a large field of view (FOV). For example, expanded image light 340 provided to user's eye 390 may have a diagonal FOV (in x and y) of about 60 degrees or greater and/or about 150 degrees or less. Output waveguide 320 may be configured to provide an eyebox with a length of about 20 mm or greater and/or equal to or less than about 50 mm, and/or a width of about 10 mm or greater and/or equal to or less than about 50 mm.

Figure 4:
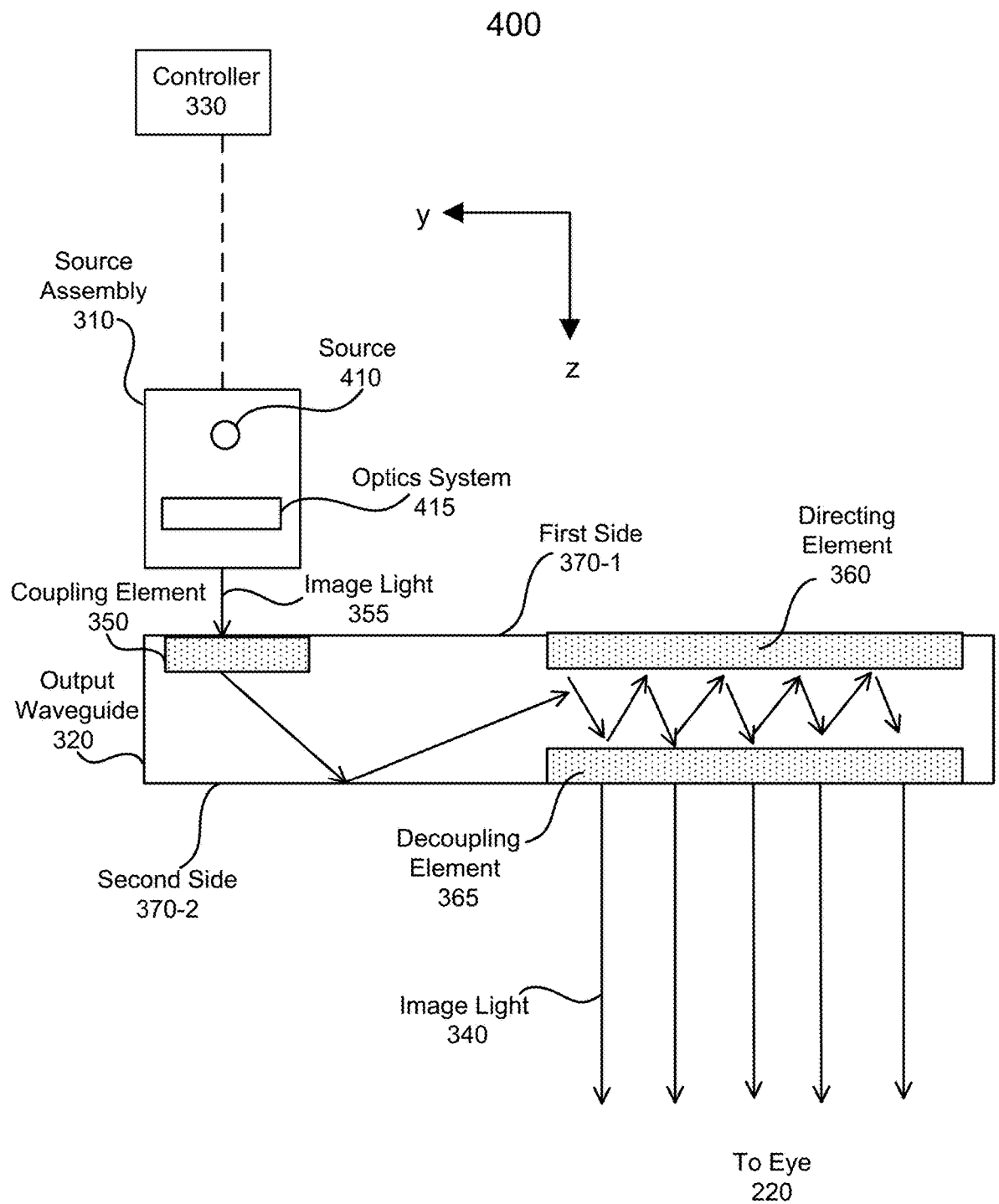
FIG. 4 is a cross-sectional view of an example waveguide display according to certain embodiments.

FIG. 4 is a cross-sectional view 400 of the waveguide display 300. Waveguide display 300 may include source assembly 310 and output waveguide 320. Source assembly 310 may generate image light 355 (i.e., display light) in accordance with scanning instructions from controller 330. Source assembly 310 may include a source 410 and an optics system 415. Source 410 may include a light source that generates coherent or partially coherent light. Source 410 may include, for example, a laser diode, a vertical cavity surface emitting laser, and/or a light emitting diode.

Optics system 415 may include one or more optical components that can condition the light from source 410. Conditioning light from source 410 may include, for example, expanding, collimating, and/or adjusting orientation in accordance with instructions from controller 330. The one or more optical components may include one or more lenses, liquid lenses, mirrors, apertures, and/or gratings. Light emitted from optics system 415 (and also source assembly 310) may be referred to as image light 355 or display light.

Output waveguide 320 may receive image light 355 from source assembly 310. Coupling element 350 may couple image light 355 from source assembly 310 into output waveguide 320. In embodiments where coupling element 350 includes a diffraction grating, the diffraction grating may be configured such that total internal reflection may occur within output waveguide 320, and thus image light 355 coupled into output waveguide 320 may propagate internally within output waveguide 320 (e.g., by total internal reflection) toward decoupling element 365.

Directing element 360 may redirect image light 355 toward decoupling element 365 for coupling at least a portion of the image light out of output waveguide 320. In embodiments where directing element 360 is a diffraction grating, the diffraction grating may be configured to cause incident image light 355 to exit output waveguide 320 at angle(s) of inclination relative to a surface of decoupling element 365. In some embodiments, directing element 360 and/or the decoupling element 365 may be structurally similar, and may switch their roles for different portions of image light 355.

Expanded image light 340 exiting output waveguide 320 may be expanded along one or more dimensions (e.g., elongated along the x-dimension). In some embodiments, waveguide display 300 may include a plurality of source assemblies 310 and a plurality of output waveguides 320. Each of source assemblies 310 may emit a monochromatic image light corresponding to a primary color (e.g., red, green, or blue). Each of output waveguides 320 may be stacked together to output an expanded image light 340 that may be multi-colored.

Figure 5:
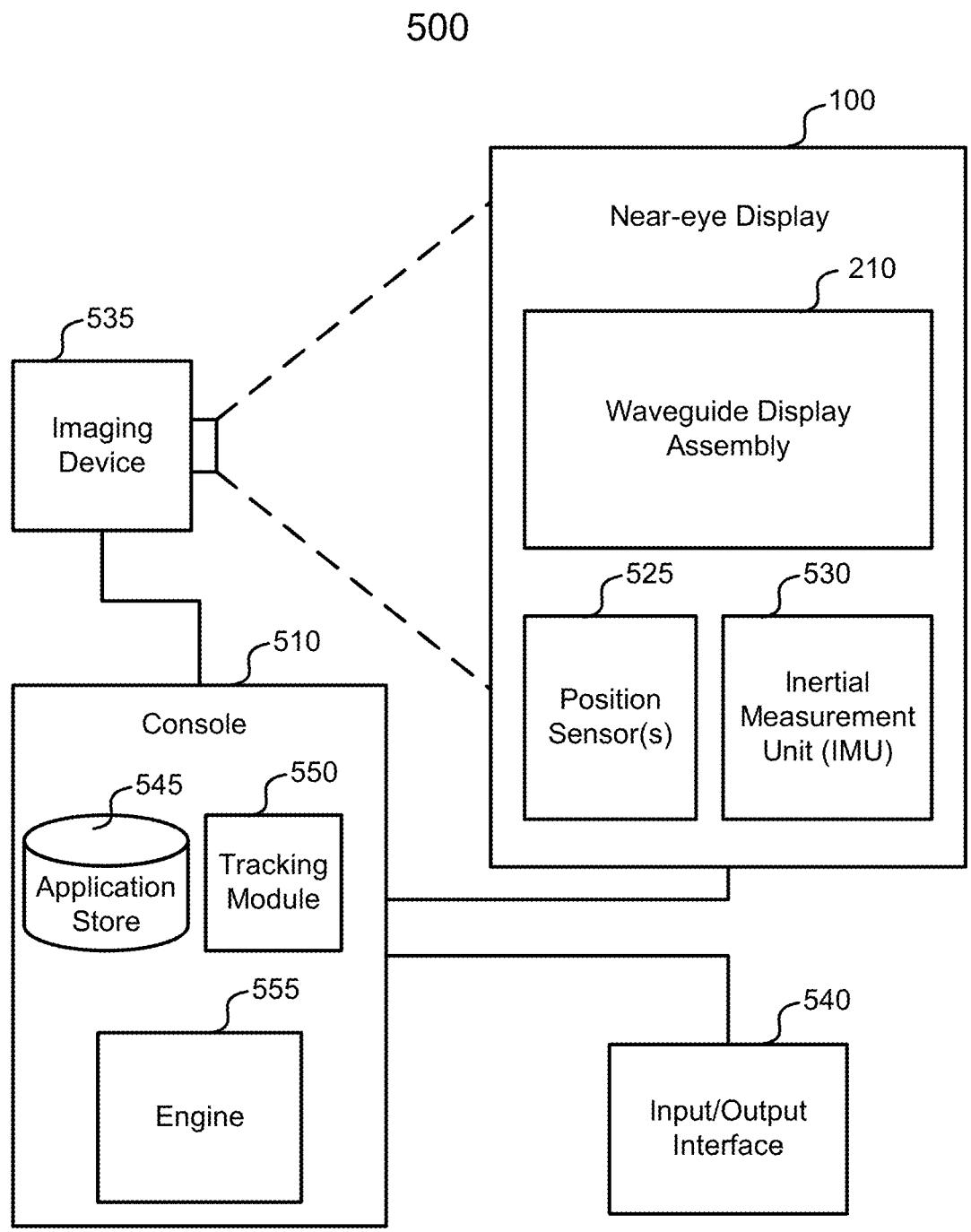
FIG. 5 is a simplified block diagram of an example artificial reality system including a waveguide display.

FIG. 5 is a simplified block diagram of an example artificial reality system 500 including waveguide display assembly 210. System 500 may include near-eye display 100, an imaging device 535, and an input/output interface 540 that are each coupled to a console 510.

As described above, near-eye display 100 may be a display that presents media to a user. Examples of media presented by near-eye display 100 may include one or more images, video, and/or audio. In some embodiments, audio may be presented via an external device (e.g., speakers and/or headphones) that may receive audio information from near-eye display 100 and/or console 510 and present audio data based on the audio information to a user. In some embodiments, near-eye display 100 may act as an artificial reality eyewear glass. For example, in some embodiments, near-eye display 100 may augment views of a physical, real-world environment, with computer-generated elements (e.g., images, video, sound, etc.).

Near-eye display 100 may include waveguide display assembly 210, one or more position sensors 525, and/or an inertial measurement unit (IMU) 530. Waveguide display assembly 210 may include source assembly 310, output waveguide 320, and controller 330, as described above.

IMU 530 may include an electronic device that can generate fast calibration data indicating an estimated position of near-eye display 100 relative to an initial position of near-eye display 100 based on measurement signals received from one or more position sensors 525.

Imaging device 535 may generate slow calibration data in accordance with calibration parameters received from console 510. Imaging device 535 may include one or more cameras and/or one or more video cameras.

Input/output interface 540 may be a device that allows a user to send action requests to console 510. An action request may be a request to perform a particular action. For example, an action request may be to start or end an application or to perform a particular action within the application.

Console 510 may provide media to near-eye display 100 for presentation to the user in accordance with information received from one or more of: imaging device 535, near-eye display 100, and input/output interface 540. In the example shown in FIG. 5, console 510 may include an application store 545, a tracking module 550, and an engine 555.

Application store 545 may store one or more applications for execution by the console 510. An application may include a group of instructions that, when executed by a processor, may generate content for presentation to the user. Examples of applications may include gaming applications, conferencing applications, video playback application, or other suitable applications.

Tracking module 550 may calibrate system 500 using one or more calibration parameters and may adjust one or more calibration parameters to reduce error in determination of the position of near-eye display 100. Tracking module 550 may track movements of near-eye display 100 using slow calibration information from imaging device 535. Tracking module 550 may also determine positions of a reference point of near-eye display 100 using position information from the fast calibration information.

Engine 555 may execute applications within system 500 and receives position information, acceleration information, velocity information, and/or predicted future positions of near-eye display 100 from tracking module 550. In some embodiments, information received by engine 555 may be used for producing a signal (e.g., display instructions) to waveguide display assembly 210. The signal may determine a type of content to present to the user.

There may be many different ways to implement the waveguide display. For example, in some implementations, output waveguide 320 may include a slanted surface between first side 370-1 and second side 370-2 for coupling image light 355 into output waveguide 320. In some implementations, the slanted surface may be coated with a reflective coating to reflect light towards directing element 360. In some implementations, the angle of the slanted surface may be configured such that image light 355 may be reflected by the slanted surface due to total internal reflection. In some implementations, directing element 360 may not be used, and light may be guided within output waveguide 320 by total internal reflection. In some implementations, decoupling elements 365 may be located near first side 370-1.

In some implementations, output waveguide 320 and decoupling element 365 (and directing element 360 if used) may be transparent to light from the environment, and may act as an optical combiner to combine image light 355 and light from the physical, real-world environment in front of near-eye display 100. As such, the user can view both artificial images of artificial objects from source assembly 310 and real images of real objects in the physical, real-world environment.

Figure 6:
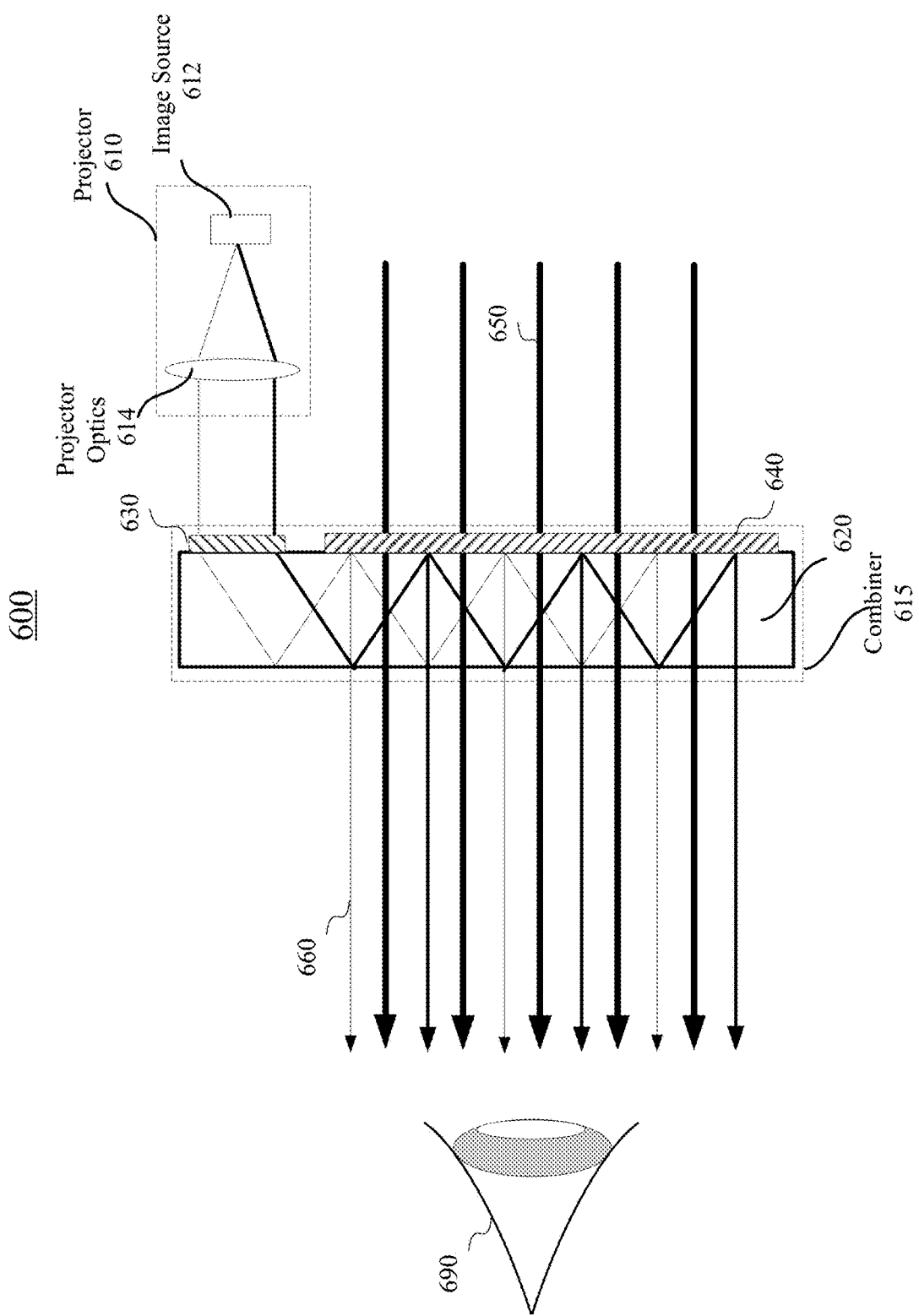
FIG. 6 illustrates an example optical see-through augmented reality system using a waveguide display according to certain embodiments.

FIG. 6 illustrates an example optical see-through augmented reality system 600 using a waveguide display according to certain embodiments. Augmented reality system 600 may include a projector 610 and a combiner 615. Projector 610 may include a light source or image source 612 and projector optics 614. In some embodiments, image source 612 may include a plurality of pixels that displays virtual objects, such as an LCD display panel or an LED display panel. In some embodiments, image source 612 may include a light source that generates coherent or partially coherent light. For example, image source 612 may include a laser diode, a vertical cavity surface emitting laser, and/or a light emitting diode. In some embodiments, image source 612 may include a plurality of light sources each emitting a monochromatic image light corresponding to a primary color (e.g., red, green, or blue). In some embodiments, image source 612 may include an optical pattern generator, such as a spatial light modulator. Projector optics 614 may include one or more optical components that can condition the light from image source 612, such as expanding, collimating, scanning, or projecting light from image source 612 to combiner 615. The one or more optical components may include one or more lenses, liquid lenses, mirrors, apertures, and/or gratings. In some embodiments, projector optics 614 may include a liquid lens (e.g., a liquid crystal lens) with a plurality of electrodes that allows scanning of the light from image source 612.

Combiner 615 may include an input coupler 630 for coupling light from projector 610 into a substrate 620 of combiner 615. Input coupler 630 may include a volume holographic grating, a DOE (e.g., a surface-relief grating), or a refractive coupler (e.g., a wedge or a prism). Input coupler 630 may have a coupling efficiency of greater than 30%, 50%, 75%, 90%, or higher for visible light. As used herein, visible light may refer to light with a wavelength between about 380 nm to about 750 nm. Light coupled into substrate 620 may propagate within substrate 620 through, for example, total internal reflection (TIR). Substrate 620 may be in the form of a lens of a pair of eyeglasses. Substrate 620 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 620 may be transparent to visible light. A material may be "transparent" to a light beam if the light beam can pass through the material with a high transmission rate, such as larger than 60%, 75%, 80%, 90%, 95%, or higher, where a small portion of the light beam (e.g., less than 60%, 25%, 20%, 10%, 5%, or less) may be scattered, reflected, or absorbed by the material. The transmission rate (i.e., transmissivity) may be represented by either a photopically weighted or an unweighted average transmission rate over a range of wavelengths, or the lowest transmission rate over a range of wavelengths, such as the visible wavelength range.

Substrate 620 may include a plurality of output couplers 640 configured to extract at least a portion of the light guided by and propagating within substrate 620 from substrate 620 and direct extracted light 660 to an eye 690 of the user of augmented reality system 600. As input coupler 630, output couplers 640 may include grating couplers (e.g., volume holographic gratings or surface-relief gratings), prisms, or DOEs. Output couplers 640 may have different coupling (e.g., diffraction) efficiencies at different locations. Substrate 620 may also allow light 650 from environment in front of combiner 615 to pass through with little or no loss. Output couplers 640 may allow light 650 to pass through with little loss. For example, in some implementations, output couplers 640 may have a low diffraction efficiency for light 650 as described below such that light 650 may be refracted or otherwise pass through output couplers 640 with little loss. In some implementations, output couplers 640 may have a high diffraction efficiency for light 650 and may direct light 650 to certain desired directions (i.e., diffraction angles) with little loss. As a result, the user may be able to view combined images of the environment in front of combiner 615 and virtual objects projected by projector 610.

Figure 7:
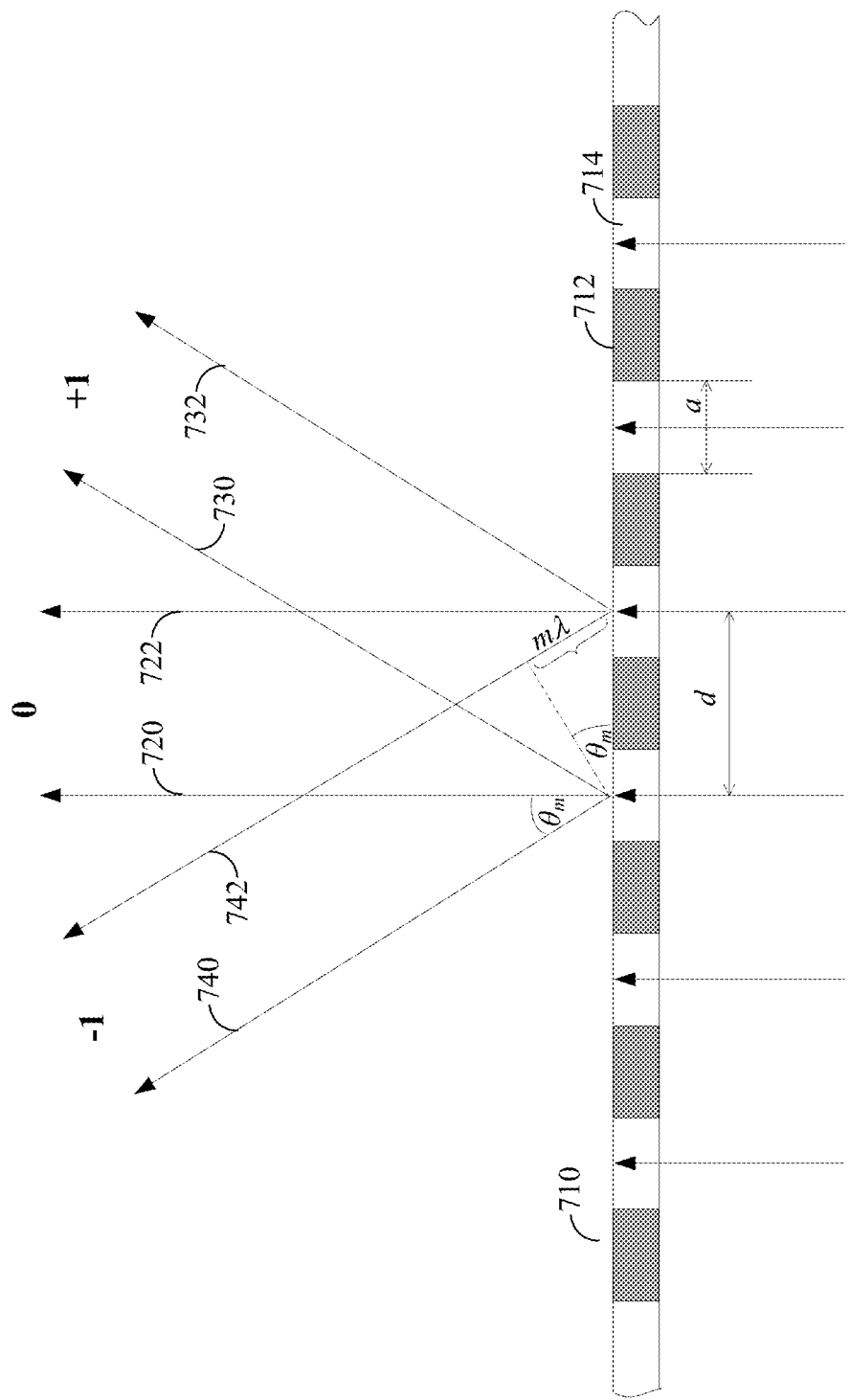
FIG. 7 illustrates example optical diffractions by an example one-dimensional grating.

FIG. 7 illustrates optical diffractions by an example one-dimensional optical grating 710. A diffraction grating may include a quasi-one dimensional structure including a series of parallel slits, notches, lines, steps, etc. (which may be referred to as grating grooves). In the example, one-dimensional optical grating 710 may be a transmission grating with multiple grooves 712, where each groove 712 may have a length d and may include a slit 714 with a width a. According to the Huygens-Fresnel principle, when a plane wave is incident on the grating, each groove 712 (or slit 714) may act like a point source, emitting a spherical wave (or more accurately, a cylindrical wave). The wavefront of the propagating wave at any subsequent point can be found by summing the contributions from each of these individual point sources. For certain angles, there may be a destructive interference. For some other angles, there may be a constructive interference. The peaks of the constructive interference may be referred to as diffraction orders. The diffraction angle $\theta_m$ for the mth diffraction order of surface-normal incident light may be determined by the following grating equation:

$$d \sin \theta_m = m\lambda,$$

where $\lambda$ is the wavelength of the incident wave. For example, for zero order diffraction (transmission) represented by lines 720 and 722, the diffraction angle is 0. For the +1st diffraction order represented by lines 730 and 732, the diffraction angle is positive (to the right of the zero order). For the −1st diffraction order represented by lines 740 and 742, the diffraction angle is negative (to the left of the zero order). It can be seen from the above grating equation that the diffraction angle θm for the same mth diffraction order is different for light with a different wavelength $\lambda$ (color), which may be referred to as the chromatic dispersion (or simply dispersion) of the grating.

The electrical field of the light diffracted by a grating may also be analyzed using Fourier optics according to, $$o(x) = g(x) \otimes i(x), \text{ or}$$

$$O(f) = G(f) \times i(f),$$

where I(f), G(f), and O(f) are the Fourier transforms of input field i(x), grating function g(x), and output field o(x), respectively.

For example, the intensity of the electrical field of a plane wave at angle $\theta$ may be determined by the diffraction by a single slit and the interference by the multiple slits of the grating. For example, when N grooves of the diffraction grating are illuminated by the incident wave, the intensity of the electrical field of the plane wave at angle $\theta$ may be determined by:

$$I(\theta) = I_0 \left[\text{sinc}\left(\frac{\pi a}{\lambda}\sin\theta\right)\right]^2 \left[\frac{\sin\left(\frac{N\pi d}{\lambda}\sin\theta\right)}{\sin\left(\frac{\pi d}{\lambda}\sin\theta\right)}\right]^2,$$

where the factor $$\left[\text{sinc}\left(\frac{\pi a}{\lambda}\sin\theta\right)\right]^2$$

represents the diffraction effect of a single slit with a width a, and the factor $$\left[\frac{\sin\left(\frac{N\pi d}{\lambda}\sin\theta\right)}{\sin\left(\frac{\pi d}{\lambda}\sin\theta\right)}\right]^2$$

represents the interference effect of the N grooves (or slits) of the grating.

Figure 8:
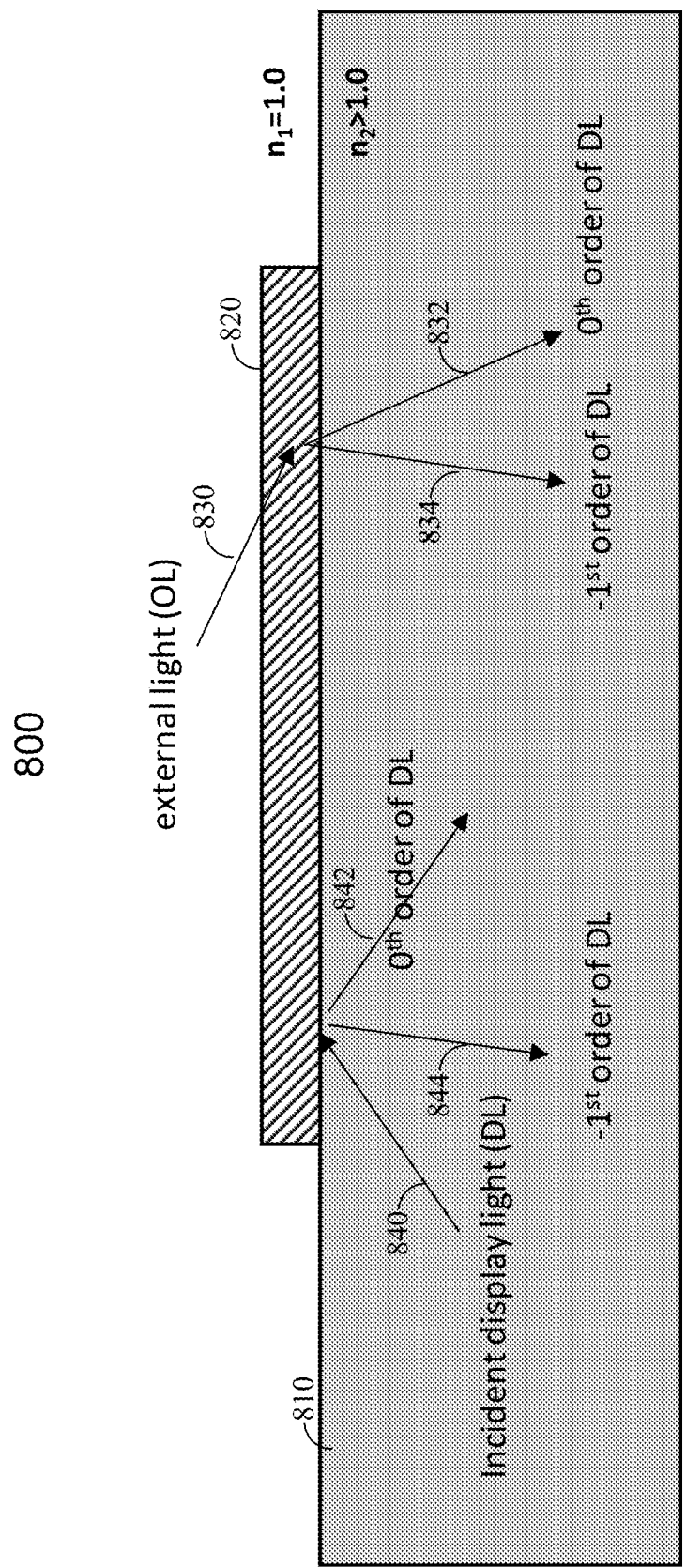
FIG. 8 illustrates propagations of display light and external light in an example waveguide display.

FIG. 8 illustrates propagations of incident display light 840 and external light 830 in an example waveguide display 800 including a waveguide 810 and a grating coupler 820. Waveguide 810 may be a flat or curved transparent substrate with a refractive index $n_2$ greater than the free space refractive index $n_1$ (i.e., 1.0). Grating coupler 820 may be, for example, a Bragg grating or a surface-relief grating.

Incident display light 840 may be coupled into waveguide 810 by, for example, input coupler 630 of FIG. 6 or other couplers (e.g., a prism or slanted surface) described above. Incident display light 840 may propagate within waveguide 810 through, for example, total internal reflection. When incident display light 840 reaches grating coupler 820, incident display light 840 may be diffracted by grating coupler 820 into, for example, a $0^{th}$ order diffraction (i.e., reflection) light 842 and a −1st order diffraction light 844. The $0^{th}$ order diffraction may propagate within waveguide 810, and may be reflected by the bottom surface of waveguide 810 towards grating coupler 820 at a different location. The −1st order diffraction light 844 may be coupled (e.g., refracted) out of waveguide 810 towards the user's eye, because a total internal reflection condition may not be met at the bottom surface of waveguide 810 due to the diffraction angle.

External light 830 may also be diffracted by grating coupler 820 into, for example, a $0^{th}$ order diffraction light 832 and a −1st order diffraction light 834. Both the $0^{th}$ order diffraction light 832 and the −1st order diffraction light 834 may be refracted out of waveguide 810 towards the user's eye. Thus, grating coupler 820 may act as an input coupler for coupling external light 830 into waveguide 810, and may also act as an output coupler for coupling incident display light 840 out of waveguide 810. As such, grating coupler 820 may act as a combiner for combining external light 830 and incident display light 840. In general, the diffraction efficiency of grating coupler 820 (e.g., a surface-relief grating coupler) for external light 830 (i.e., transmissive diffraction) and the diffraction efficiency of grating coupler 820 for incident display light 840 (i.e., reflective diffraction) may be similar or comparable.

Figure 9A:
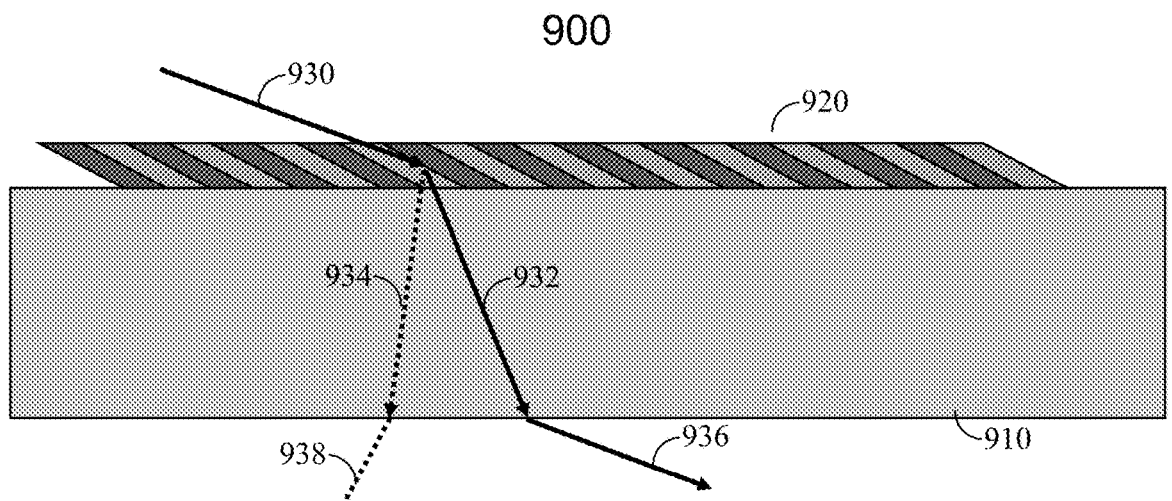
FIG. 9A illustrates the propagation of external light in an example waveguide display with a grating coupler on the front side of the waveguide display.

FIG. 9A illustrates the propagation of external light 930 in an example waveguide display 900 with a grating coupler 920 on the front side of a waveguide 910. As described above, external light 930 may be diffracted by grating coupler 920 into a $0^{th}$ order diffraction light 932 and a −1st order diffraction light 934. The $0^{th}$ order diffraction light 932 may be refracted out of waveguide 910 in a direction shown by light ray 936. The $-1^{st}$ order diffraction light 934 may be refracted out of waveguide 910 in a direction shown by light ray 938. For different wavelengths (colors), the $0^{th}$ order diffraction light may have a same diffraction angle, but the −1st order diffraction light may have different diffraction angles (i.e., wavelength dependent).

Figure 9B:
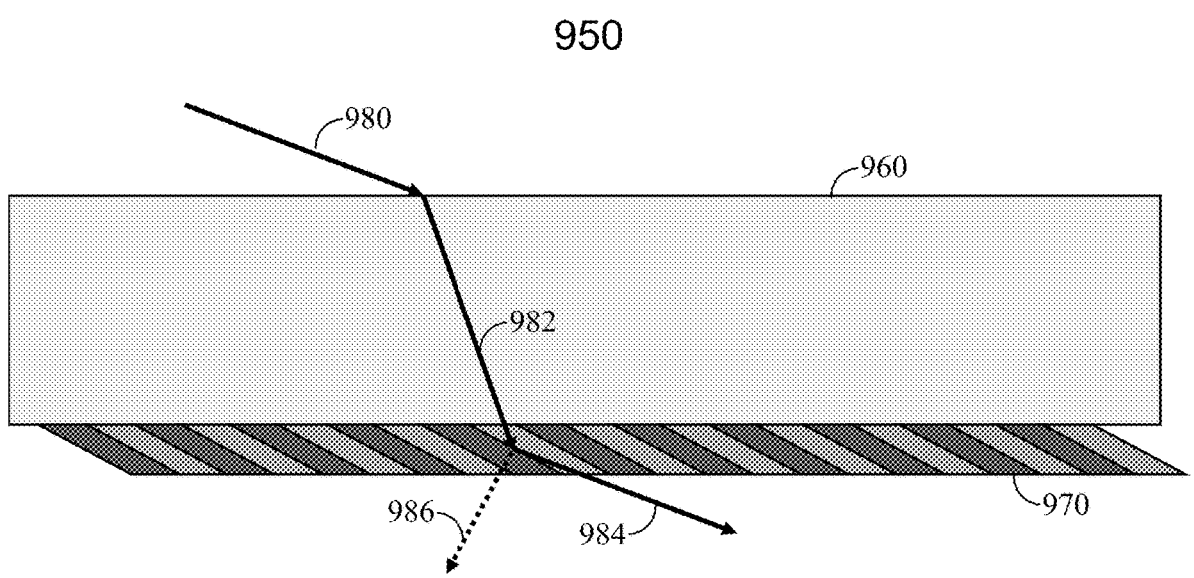
FIG. 9B illustrates the propagation of external light in an example waveguide display with a grating coupler on the back side of the waveguide display.

FIG. 9B illustrates the propagation of external light 980 in an example waveguide display 950 with a grating coupler 970 on the back side of a waveguide 960. External light 980 may be refracted into waveguide 960 as refracted light 982. Refracted light 982 may then be diffracted out of waveguide 960 by grating coupler 970 into a $0^{th}$ order diffraction light 984 and a −1st order diffraction light 986. The propagation direction of the $0^{th}$ order diffraction light 984 may be similar to the propagation direction of light ray 936. The propagation direction of the −1st order diffraction light 986 may be similar to the propagation direction of light ray 938. For different wavelengths (colors), the $0^{th}$ order diffraction light may have a same diffraction angle, but the −1st order diffraction light may have different diffraction angles (i.e., wavelength dependent).

Figure 10:
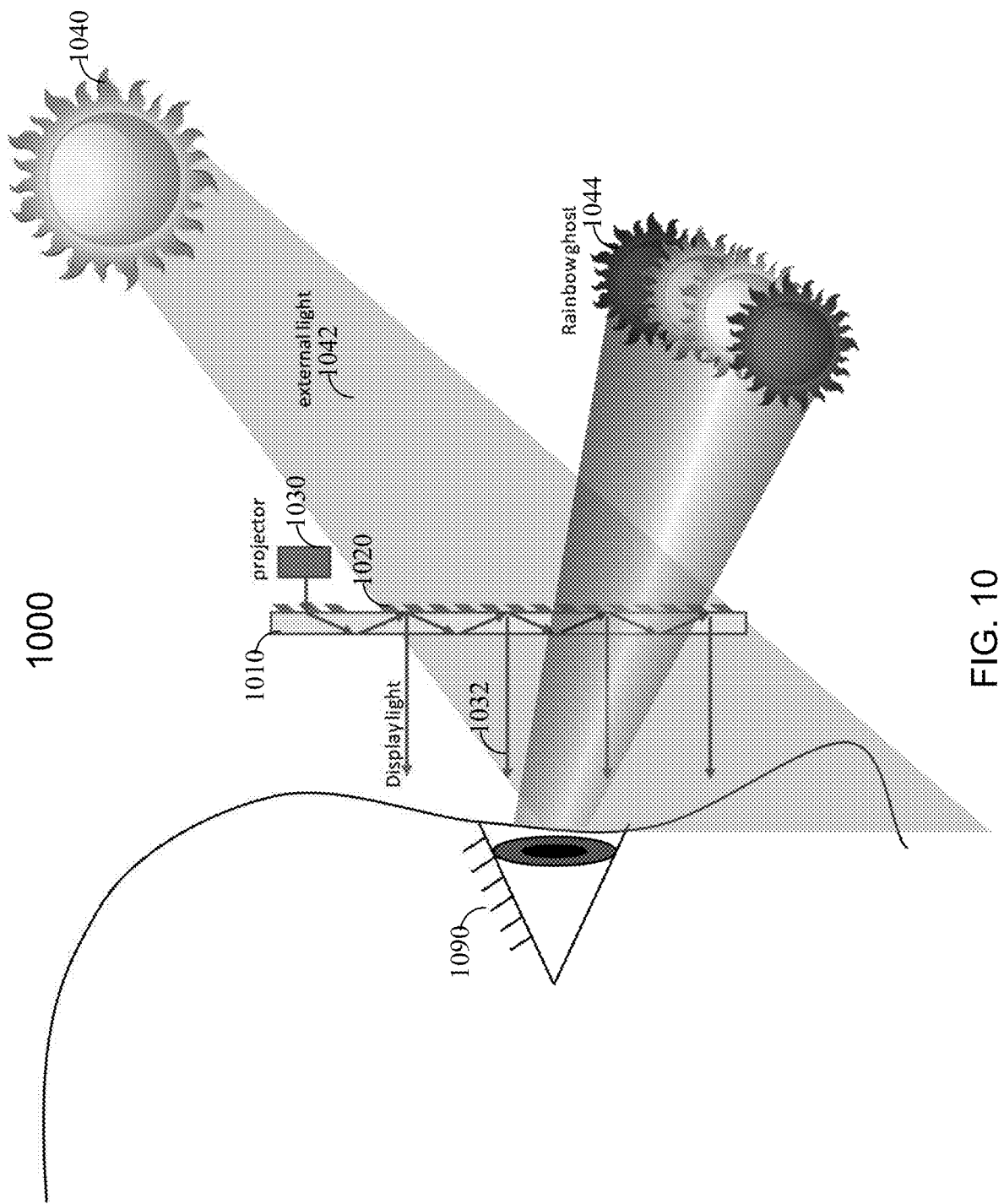
FIG. 10 illustrates rainbow artifacts in an example waveguide display.

FIG. 10 illustrates rainbow artifacts in an example waveguide display 1000. As described above, waveguide display 1000 may include a waveguide 1010, a grating coupler 1020, and a projector 1030. Display light 1032 from projector 1030 may be coupled into waveguide 1010, and may be partially coupled out of waveguide 1010 at different locations by grating coupler 1020 to reach a user's eye 1090. External light 1042 from an external light source 1040, such as the sun or a lamp, may also be diffracted by grating coupler 1020 into waveguide 1010 and may then propagate through waveguide 1010 to reach user's eye 1090.

As described above with respect to FIG. 8 and FIGS. 9A and 9B, the grating coupler may not only diffract the display light, but also diffract the external light. In addition, as described above with respect to FIG. 7, due to the chromatic dispersion of the grating, lights of different colors may be diffracted at different angles for diffractions with a diffraction order greater or less than zero. As such, the −1st order diffractions of external light of different colors that reach the user's eye (e.g., diffraction light 986 or light ray 938) may appear as ghost images located at different locations (or directions), which may be referred to as a rainbow artifact or rainbow ghost 1044. Rainbow ghost 1044 may appear on top of the displayed image or the image of the environment, and disrupt the displayed image or the image of the environment. Rainbow ghost 1044 may significantly impact the user experience. In some cases, rainbow ghost 1044 may also be dangerous to user's eye 1090 when the light from external light source 1040 (e.g., the sun) is directed to user's eye 1090 with a high efficiency.

Techniques disclosed herein may be used to reduce the rainbow ghost caused by the diffraction of external light by a grating coupler of a waveguide display. For example, in some embodiments, a slanted grating including a plurality of slanted ridges may be used as the grating coupler, wherein a height of the slanted ridges may be equal to or close to an integer multiple of the period of the slanted grating divided by the tangent of the slant angle of the slanted ridges. In one example, the height and slant angle of the slanted ridges of the slanted grating may be designed so that the height of the grating is equal to or close to the period of the slanted grating divided by the tangent of the slant angle of the slanted ridges. In other words, a top left (or right) point on a first ridge of the slanted grating may be vertically aligned with a bottom left (or right) point of a second ridge of the slanted grating. Thus, the slanted grating may be considered as including two overlapped slanted gratings with an offset of about a half of the grating period between the two slanted gratings. As a result, external light diffracted by the two offset slanted gratings (e.g., the −1st order diffraction) may be out of phase by about 180°, and thus may destructively interfere with each other such that most of the external light may enter the waveguide as the $0^{th}$ order diffraction, which may not be wavelength dependent. In this way, the rainbow ghost caused by the −1st order diffraction of external light by the grating coupler may be reduced or eliminated. Thus, the efficiency of the −1st order transmissive diffraction of the grating coupler for the external light can be much lower than that of the −1st order reflective diffraction of the grating coupler for the display light. For example, the efficiency for the −1st order diffraction of the display light may be greater than about 5%, about 20%, about 30%, about 50%, about 75%, about 90%, or higher, while the efficiency for the −1st order diffraction of the external light may be less than about 2%, less than about 1%, less than about 0.5%, or lower. In some implementations, an anti-reflective coating may be used to reduce the reflection of the external light at a surface of the waveguide or the grating coupler, where the external light, if reflected back to the grating coupler and diffracted by the grating coupler, may cause rainbow ghosts and/or other artifacts.

Figure 11A:
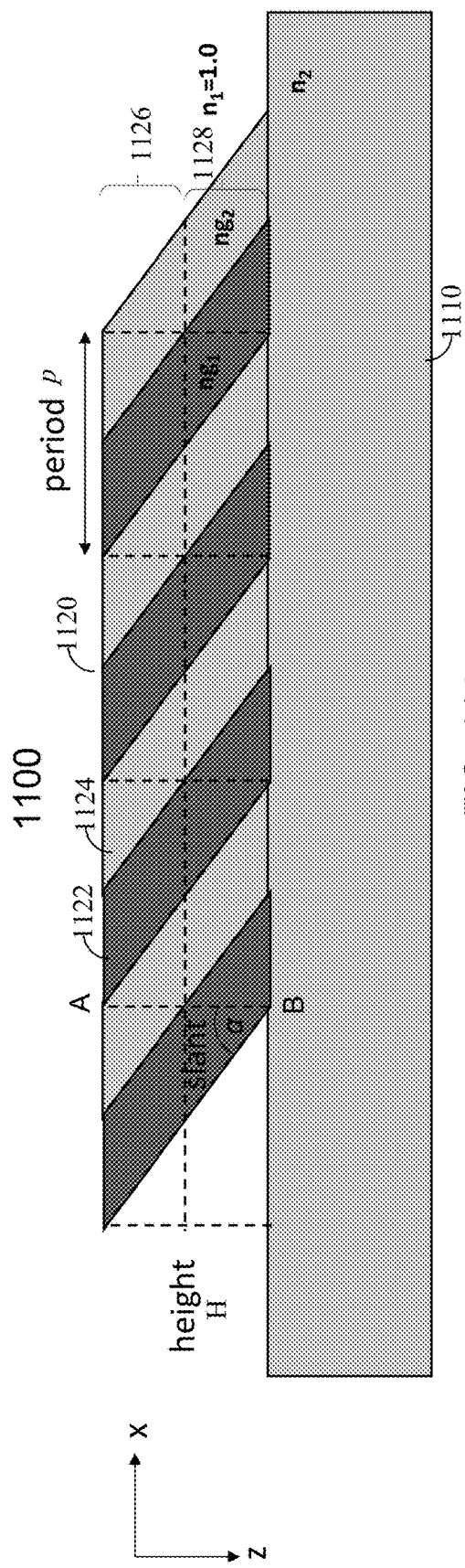
FIG. 11A illustrates an example grating coupler with reduced rainbow artifacts according to certain embodiments.

FIG. 11A illustrates an example grating coupler 1120 of a waveguide display 1100 with reduced rainbow artifacts according to certain embodiments. Grating coupler 1120 may be formed on a waveguide 1110 (e.g., a transparent substrate with a refractive index $n_2$) of waveguide display 1100. Grating coupler 1120 may include a plurality of periods in the x (horizontal) direction. Each period may include a first slanted region 1122 formed of a material with a refractive index $n_{g1}$, and a second slanted region 1124 formed of a material with a refractive index $n_{g2}$. In various embodiments, the difference between $n_{g1}$ and $n_{g2}$ may be greater than 0.1, 0.2, 0.3, 0.5, 1.0, or higher. In some implementations, one of first slanted region 1122 and second slanted region 1124 may be an air gap with a refractive index of about 1.0. First slanted region 1122 and second slanted region 1124 may have a slant angle α with respect to the z (vertical) direction. The height (H) of first slanted region 1122 and second slanted region 1124 may be equal or close to (e.g., within about 5% or 10% of) an integer multiple (m) of the grating period p divided by the tangent of the slant angle α, i.e., $$H \times \tan(\alpha) \cong m \times p.$$

In the example shown in FIG. 11A, m is equal to 1. Thus, the top left point A of a first slanted region 1122 in a grating period may align vertically with bottom left point B of another first slanted region 1122 in a different grating period. Grating coupler 1120 may thus include a first (top) slanted grating 1126 and a second (bottom) slanted grating 1128 each having a height of H/2. First slanted grating 1126 and a second slanted grating 1128 may be offset from each other in the x direction by p/2.

Figure 11B:
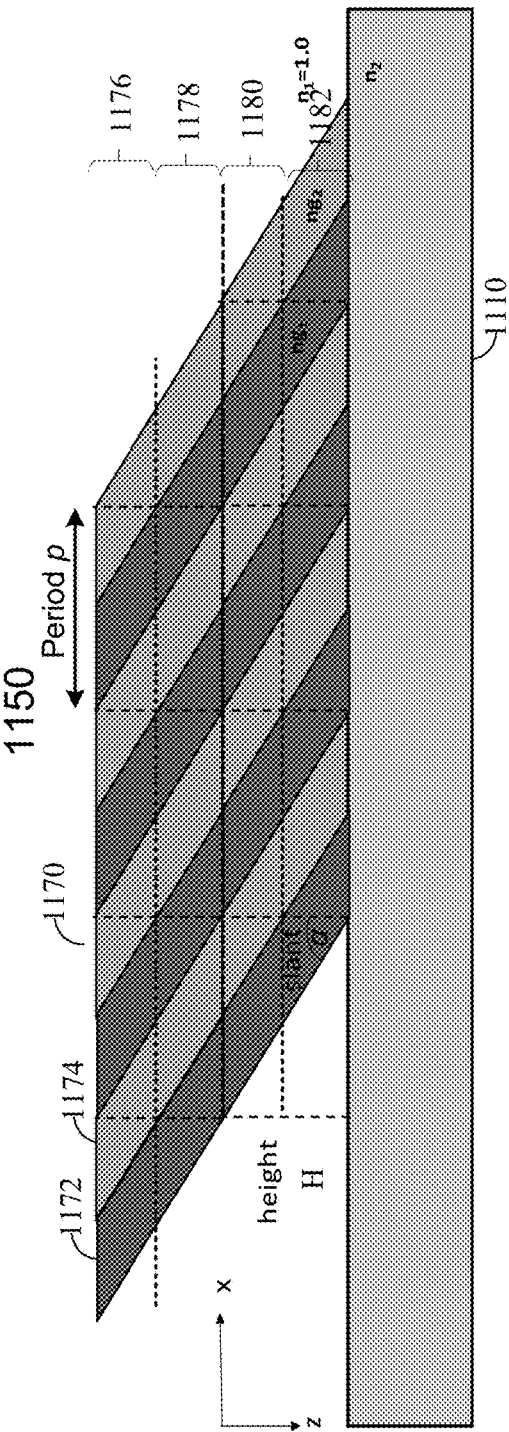
FIG. 11B illustrates another example grating coupler with reduced rainbow artifacts according to certain embodiments.

FIG. 11B illustrates another example grating coupler 1170 of a waveguide display 1150 with reduced rainbow artifacts according to certain embodiments. In the example shown in FIG. 11B, m is equal to 2. Grating coupler 1170 may thus include four overlapped slanted gratings 1176-1182 each having a height of H/4 and offset from each other by a half grating period (p/2) in the x direction.

Figure 12:
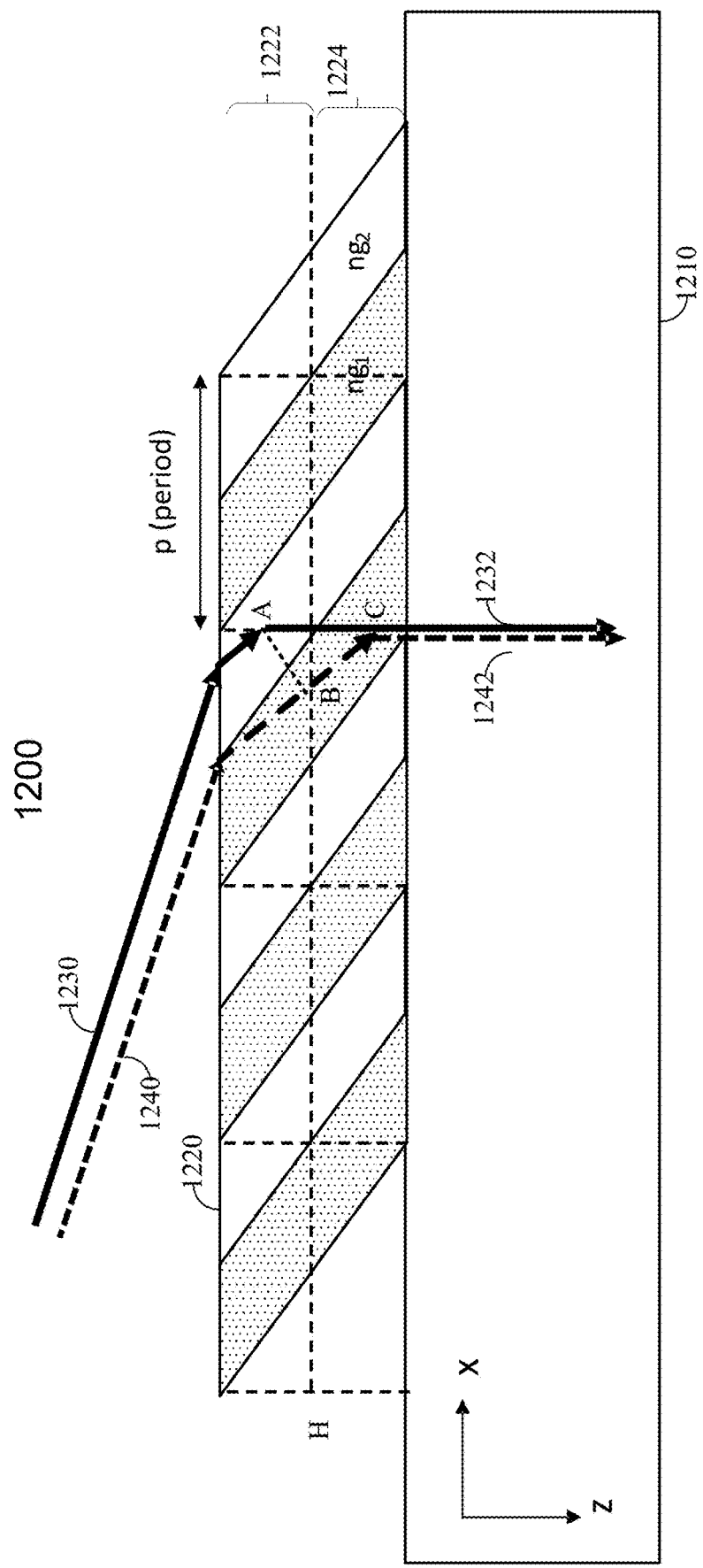
FIG. 12 is a simplified diagram illustrating external light diffraction by a grating coupler in a waveguide display according to certain embodiments.

FIG. 12 is a simplified diagram illustrating external light diffraction (transmissive diffraction) by a grating coupler 1220 in a waveguide display 1200 according to certain embodiments. As waveguide display 950, waveguide display 1200 may include a waveguide 1210 and grating coupler 1220 on one side of waveguide 1210. Grating coupler 1220 may include a first (top) slanted grating 1222 and a second (bottom) slanted grating 1224 each having a height of H/2, where H is the height of grating coupler 1220. First slanted grating 1222 and second slanted grating 1224 may be offset from each other in the x direction by about p/2, where p is the grating period of grating coupler 1220.

External light (e.g., a plane wave) incident on grating coupler 1220 may include a first portion (external light 1230) and a second portion (external light 1240) that may have the same phase. External light 1230 may be refracted into grating coupler 1220 and diffracted by first slanted grating 1222 into a −1st order diffraction light 1232, and external light 1240 may be refracted into grating coupler 1220 and diffracted by second slanted grating 1224 into a −1st order diffraction light 1242. Point A and point B are in phase. Therefore, the phase difference between diffraction light 1232 and diffraction light 1242 may be approximated by:

$$2\pi \frac{OPL_{AC} - OPL_{BC}}{\lambda_0} + \Delta,$$

where $OPL_{AC}$ is the optical length (physical length multiplied by the refractive index) between point A and point C, $OPL_{BC}$ is the optical length between point B and point C, $\lambda_0$ is the wavelength of the external light in free space, and $\Delta$ is the phase difference caused by the diffraction by first slanted grating 1222 and the diffraction by second slanted grating 1224. The difference between $OPL_{AC}$ and $OPL_{BC}$ may be fairly small, and thus the phase difference between diffraction light 1232 and diffraction light 1242 may be close to $\Delta$.

As described above, the electrical field of the light diffracted by a grating may be analyzed using Fourier optics. The Fourier transform of grating function g(x) for first slanted grating 1222 may be:

$$F(g(x)) = G(f).$$

The Fourier transform of the grating function for second slanted grating 1224 may be:

$$F(g(x-a)) = e^{-i2\pi f a} G(f),$$

where a is the offset of second slanted grating 1224 with respect to first slanted grating 1222 in the x direction. Because the spatial frequency f of the grating is equal to 1/p, when a is equal to p/2, $e^{-i2\pi f a}$ becomes $e^{-i\pi}$. As such, the electrical field of the light diffracted by first slanted grating 1222 and the electrical field of the light diffracted by second slanted grating 1224 may be out of phase by about 180° (or $\pi$). Therefore, $\Delta$ may be equal to about $\pi$. Because the optical
path difference between $OPL_{AC}$ and $OPL_{BC}$ is fairly small, $$2\pi \frac{OPL_{AC} - OPL_{BC}}{\lambda_0} + \Delta$$

may be close to $\pi$ to cause at least partial destructive interference between diffraction light 1232 and diffraction light 1242.

To further reduce the overall $-1^{st}$ order diffraction of external light by grating coupler 1220, it is desirable that the phase difference between diffraction light 1232 and diffraction light 1242 is about 180° (or $\pi$), such that diffraction light 1232 and diffraction light 1242 can destructively interfere to cancel each other. In some embodiments, the height, period, and/or slant angle of grating coupler 1220 may be adjusted such that $\Delta$ may be different from $\pi$, but $$2\pi \frac{OPL_{AC} - OPL_{BC}}{\lambda_0} + \Delta$$

may be approximately equal to $\pi$ to cause destructive interference between diffraction light 1232 and diffraction light 1242.

Figure 13A:
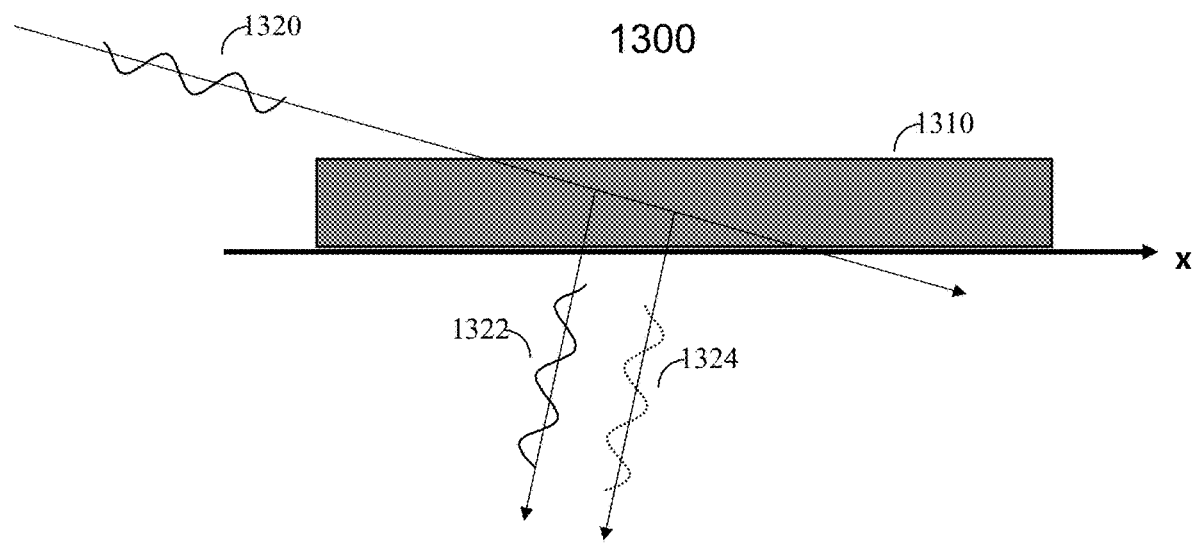
FIG. 13A illustrates light diffracted by a grating coupler in a waveguide display according to certain embodiments.

FIG. 13A illustrates light diffracted by a grating coupler 1310 in a waveguide display 1300 according to certain embodiments. Grating coupler 1310 may be similar to grating coupler 1220, and thus incident light 1320 (e.g., external light) may be diffracted by grating coupler 1310 into a first portion 1322 and a second portion 1324. As described above, by adjusting the height, period, and/or slant angle of grating coupler 1310, first portion 1322 and second portion 1324 may be out of phase by about 180° due to the relationship between the height, period, and slant angle of grating coupler 1310.

Figure 13B:
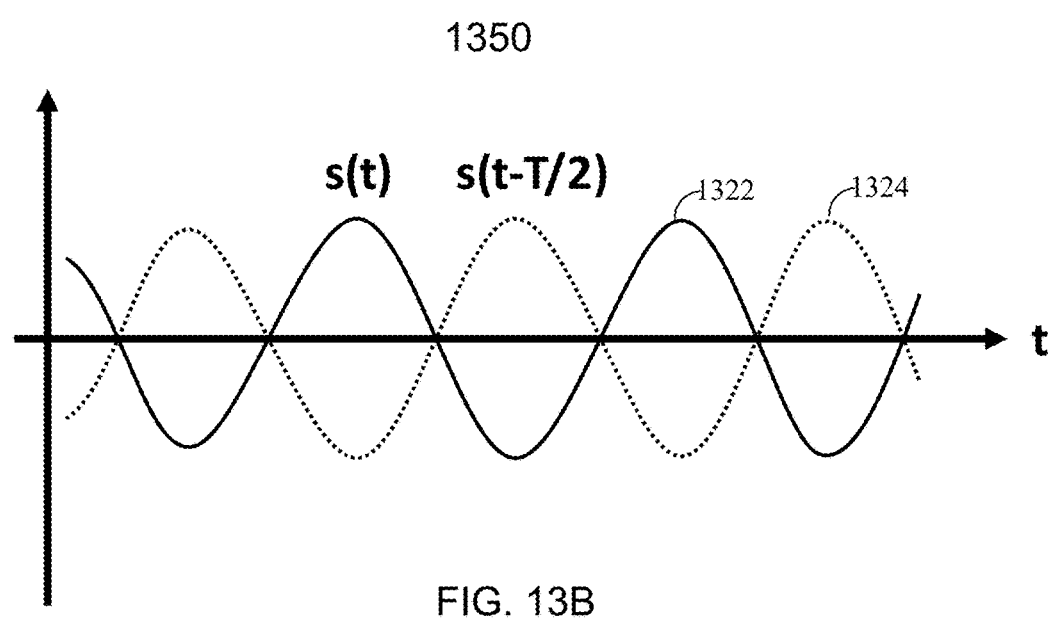
FIG. 13B is a waveform diagram illustrating the external light rainbow artifact reduction using a grating coupler according to certain embodiments.

FIG. 13B is a waveform diagram 1350 illustrating external light rainbow artifact reduction using grating coupler 1310 in waveguide display 1300 according to certain embodiments. The time domain waveforms of first portion 1322 and second portion 1324 may have the same frequency and amplitude, but may be time-shifted by a half time period (i.e., phase-shifted by 180°). Therefore, first portion 1322 and second portion 1324 may destructively interfere with each other, such that a sum (the overall electrical field) of first portion 1322 and second portion 1324 is about zero. In other words, the $-1$st order diffraction of external light by grating coupler 1310 may be significantly reduced or substantially eliminated.

Figure 14:
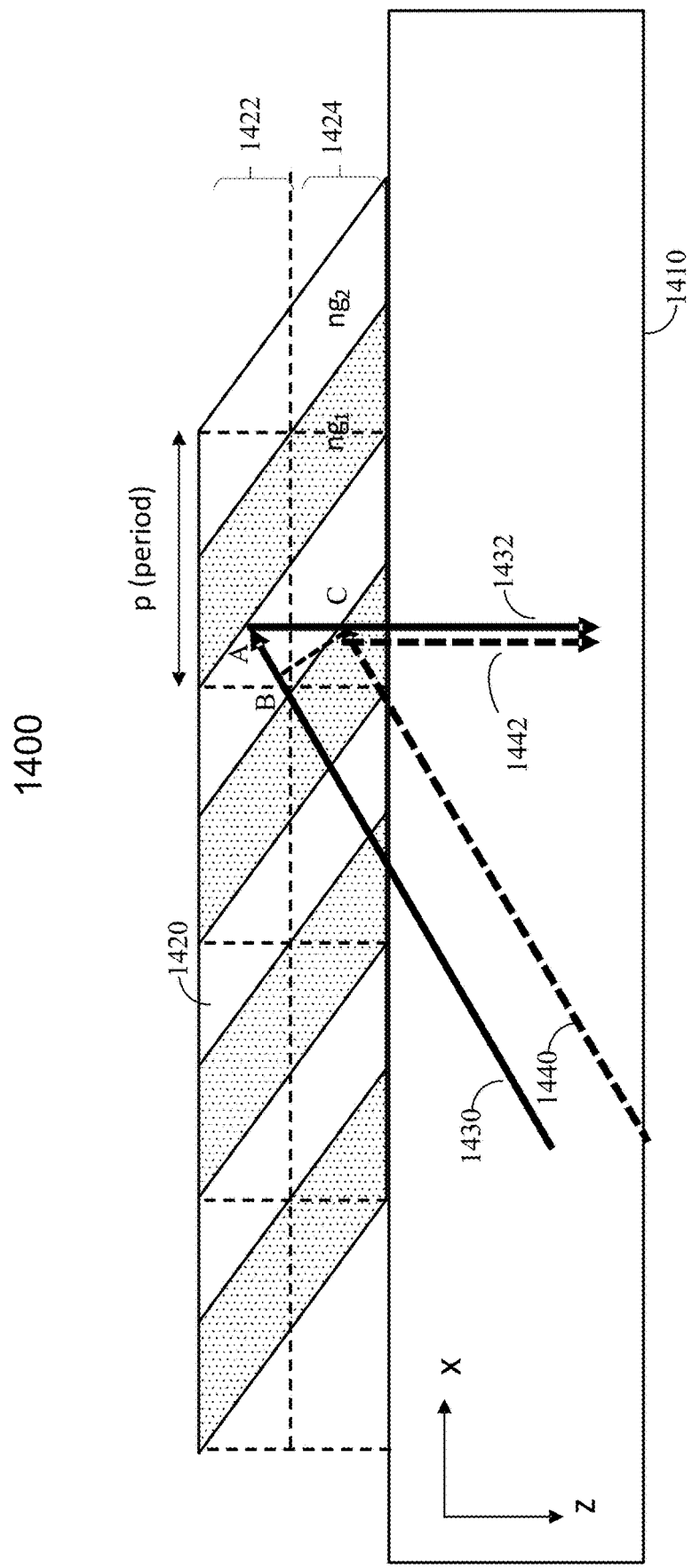
FIG. 14 is a simplified diagram illustrating the diffraction of display light by a grating coupler according to certain embodiments.

FIG. 14 is a simplified diagram illustrating display light diffraction (reflective diffraction) by a grating coupler 1420 in a waveguide display 1400 according to certain embodiments. As waveguide display 1200, waveguide display 1400 may include a waveguide 1410 and a grating coupler 1420 on one side of waveguide 1410. Grating coupler 1420 may include a first (top) slanted grating 1422 and a second (bottom) slanted grating 1424 each having a height of H/2, where H is the height of grating coupler 1420. First slanted grating 1422 and second slanted grating 1424 may be offset from each other in the x direction by about p/2, where p is the grating period of grating coupler 1420.

Display light coupled into waveguide 1410 may include a first portion (display light 1430) and a second portion (display light 1440). Display light 1430 may be diffracted by first slanted grating 1422 into a $-1$st order diffraction light 1432, and display light 1440 may be diffracted by second slanted grating 1424 into a $-1$st order diffraction light 1442. Because diffraction light 1432 may travel a longer distance than diffraction light 1442 due to the reflective diffraction, the phase difference between diffraction light 1432 and diffraction light 1442 may be less than 180°, and thus may not destructively interfere to cancel each other. For example, the phase difference between diffraction light 1432 and diffraction light 1442 may be approximated by:

$$2\pi \frac{OPL_{AC} + OPL_{AB}}{\lambda_0} + \Delta,$$

where $OPL_{AC}$ is the optical length between point A and point C, $OPL_{AB}$ is the optical length between point A and point B, $\lambda_0$ is the wavelength of the display light in free space, and $\Delta$ is the phase difference caused by the diffraction by first slanted grating 1422 and the diffraction by second slanted grating 1424. As described above, when the height of grating coupler 1420 is equal or close to (e.g., within about 5% or 10% of) an integer multiple of the grating period divided by the tangent of the slant angle of grating coupler 1420, $\Delta$ may be equal to about $\pi$, but $$2\pi \frac{OPL_{AC} + OPL_{AB}}{\lambda_0} + \Delta$$

may be significantly different from $\pi$. When the height, period, and/or slant angle of grating coupler 1420 are adjusted to cause destructive interference between the diffracted external light as described above with respect to FIG. 12, $$2\pi \frac{OPL_{AC} + OPL_{AB}}{\lambda_0} + \Delta$$

may also be significantly different from $\pi$. Thus, diffraction light 1432 and diffraction light 1442 may not destructively interfere to cancel each other. Thus, a relatively high diffraction efficiency, such as greater than 5%, 10%, 20%, 30%, 50%, or higher, may be achieved for the display light.

In this way, the grating coupler may diffract external light with a low diffraction efficiency to reduce artifacts, and may diffract display light with a much higher diffraction efficiency to couple the display light out of the waveguide.

It is noted that the grating couplers described above with respect to FIGS. 12 and 14 are just some example implementations of grating couplers for reducing the overall diffraction of external light within a certain field of view. In various embodiments, the relationship between the height, period, and/or slant angle may be adjusted differently for different fields of view to reduce the overall diffraction of external light by the grating coupler.

In some implementations, the slanted grating described above may include a slanted surface-relief grating with empty spaces between the relief material (i.e., the ridges). In some implementations, the space between the ridges may be coated or filled with other material that has a different refractive index than the relief material. In some implementations, the slant angle may be between about 30° and about 70°. In one implementation, the grating period p of the grating coupler may be about 350 nm, the slant angle of the granting coupler may be about 60°, the height of the granting coupler may be about 202 nm, and the diffraction efficiency of the −1st diffraction of the external light by the grating coupler may be less than <1%. Because first slanted grating 1422 and second slanted grating 1424 are always offset from each other by a half grating period regardless of the duty cycle of the slanted grating, the duty cycle of the slanted grating can be any appropriate value. In some implementations, the duty cycle may be selected, for example, for ease of fabrication (e.g., etching or molding) and better mechanical characteristics. For example, in some implementations, the duty cycle may be between about 30% to about 70%.

Figure 15A:
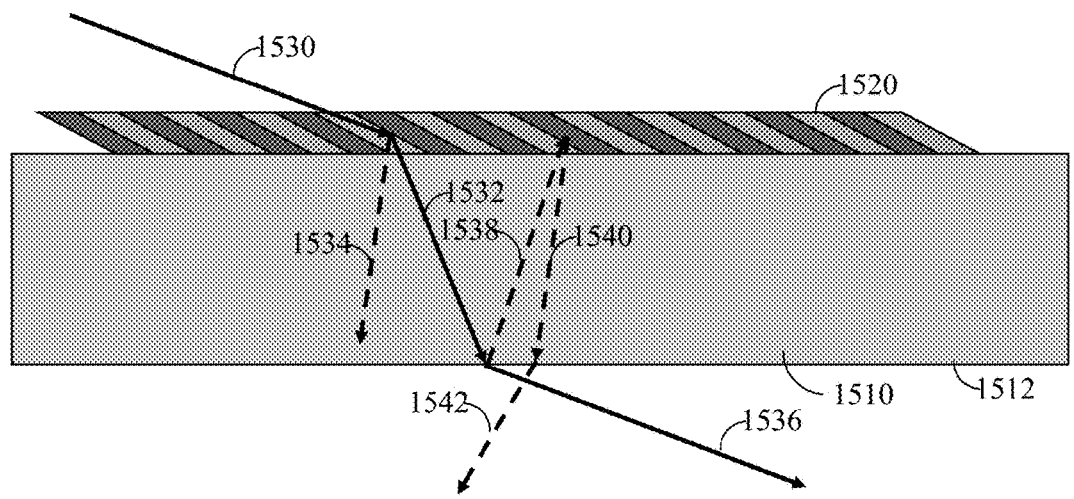
FIG. 15A illustrates rainbow artifacts caused by light reflection at a surface of a waveguide display according to certain embodiments.

FIG. 15A illustrates rainbow artifacts caused by light reflection at a surface of a waveguide display 1500 according to certain embodiments. Waveguide display 1500 may include a waveguide 1510 and a grating coupler 1520 at the top surface of waveguide 1510. Grating coupler 1520 may be similar to grating couplers 1120, 1220, 1310, and 1420 described above. External light incident on grating coupler 1520 may be diffracted by grating coupler 1520 into waveguide 1510. The diffracted light may include a $0^{th}$ order diffraction 1532 and a −1st order diffraction 1534. $0^{th}$ order diffraction 1532 may be refracted out of waveguide 1510 as light 1536. As described above, the height, period, and slant angle of grating coupler 1520 may be configured such that −1st order diffraction 1534 may be reduced or minimized.

However, $0^{th}$ order diffraction 1532 may be reflected at the bottom surface 1512 of waveguide 1510. Light 1538 reflected at bottom surface 1512 may reach grating coupler 1520 again, and may be reflectively diffracted by grating coupler 1520. As described above with respect to FIG. 14, the $-1^{st}$ order diffraction of the reflective diffraction by grating coupler 1520 may not be reduced or minimized even though grating coupler 1520 may be configured to reduce or minimize the $-1^{st}$ order diffraction of the transmissive diffraction. Thus, $-1^{st}$ order diffraction 1540 from reflected light 1538 may reach bottom surface 1512 and may be refracted out of waveguide 1510 as light 1542 that may appear as a rainbow ghost to the user's eye. Thus, waveguide display 1500 may still cause a relatively strong rainbow ghost image.

Figure 15B:
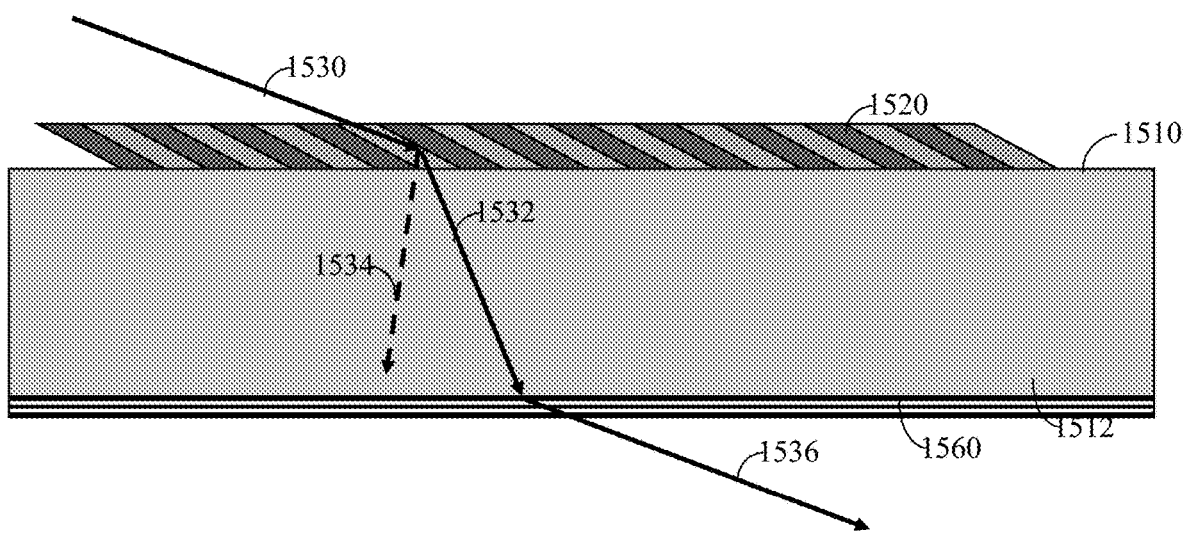
FIG. 15B illustrates an example waveguide display having an anti-reflective layer for reducing rainbow artifacts caused by light reflection at a surface of the waveguide display according to certain embodiments.

FIG. 15B illustrates an example waveguide display 1550 having an anti-reflective layer 1560 for reducing rainbow artifacts caused by light reflection at bottom surface 1512 of waveguide 1510 according to certain embodiments. Waveguide display 1550 may be similar to waveguide display 1500. Waveguide display 1550 may include an additional anti-reflection layer 1560 on bottom surface 1512 of waveguide 1510. Anti-reflection layer 1560 may include, for example, one or more dielectric thin film layers coated on bottom surface 1512, a nano-structured coating, or any other anti-reflection structures for reducing the reflection of visible light. Anti-reflection layer 1560 may be used to reduce the reflection of the diffracted external light at bottom surface 1512. Thus, little or no light may be reflected at bottom surface 1512 of waveguide 1510 back to grating coupler 1520, and therefore the rainbow ghost that might otherwise be formed due to the reflection of external light at bottom surface 1512 as described above with respect to FIG. 15A may be reduced or minimized.

Figure 16A:
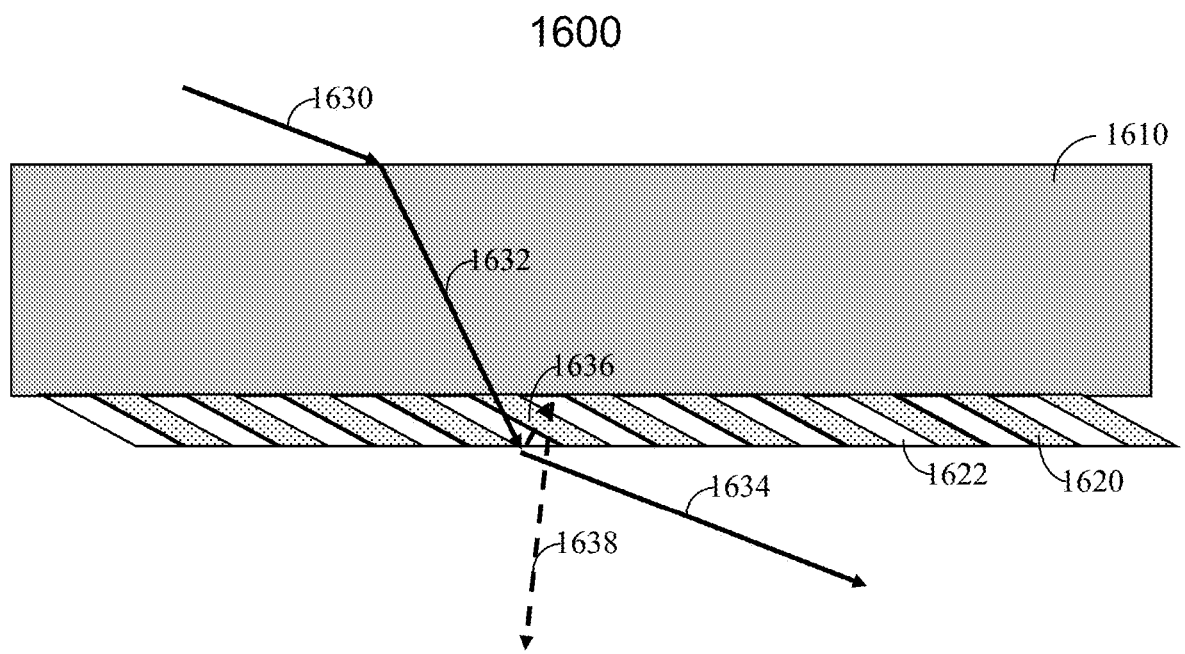
FIG. 16A illustrates rainbow artifacts caused by light reflection at a surface of a grating coupler of a waveguide display according to certain embodiments.

FIG. 16A illustrates rainbow artifacts caused by light reflection at a surface of a grating coupler 1620 of a waveguide display 1600 according to certain embodiments. Waveguide display 1600 may include a waveguide 1610 and a grating coupler 1620 at the bottom surface of waveguide 1610. Grating coupler 1620 may be similar to grating couplers 1120, 1220, 1310, 1420, and 1520 described above. External light incident on waveguide 1610 may be refracted into waveguide 1610 as external light 1632 and may then be diffracted by grating coupler 1620. The diffracted light may include a $0^{th}$ order diffraction 1634 and a −1st order diffraction (not shown). As described above, the height, period, and slant angle of grating coupler 1620 may be configured such that the −1st order diffraction may be reduced or minimized.

However, external light 1632 may be reflected at the bottom surface 1622 of grating coupler 1620. Light 1636 reflected at bottom surface 1622 of grating coupler 1620 may reach grating coupler 1620 again, and may be reflectively diffracted by grating coupler 1620. As described above with respect to FIG. 14, the $-1^{st}$ order diffraction of the reflective diffraction by grating coupler 1620 may not be reduced or minimized by a grating coupler that may be configured to reduce or minimize the $-1^{st}$ order diffraction of the transmissive diffraction. Thus, the $-1^{st}$ order diffraction 1638 from reflected light 1636 may reach the user's eye and thus may appear as a rainbow ghost to the user. Therefore, waveguide display 1600 may still cause a relatively strong rainbow ghost image.

Figure 16B:
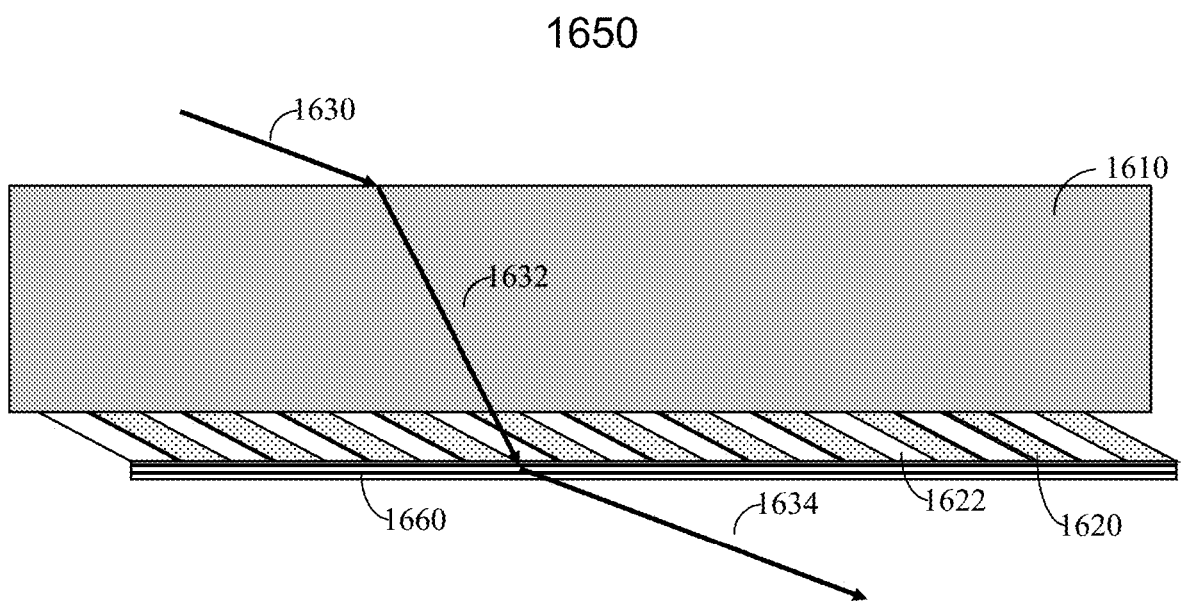
FIG. 16B illustrates an example waveguide display having an anti-reflective layer for reducing rainbow artifacts caused by light reflection at a surface of the grating coupler according to certain embodiments.

FIG. 16B illustrates an example waveguide display 1650 having an anti-reflective layer 1660 for reducing rainbow artifacts caused by light reflection at bottom surface 1622 of grating coupler 1620 of waveguide display 1650 according to certain embodiments. Waveguide display 1650 may be similar to waveguide display 1600, and may include an additional anti-reflective layer 1660 on bottom surface 1622 of grating coupler 1620. Anti-reflection layer 1660 may include one or more dielectric thin film layers coated on bottom surface 1622, and may be used to reduce the reflection of the external light at bottom surface 1622. Thus, little or no external light may be reflected at bottom surface 1622 of grating coupler 1620 back to grating coupler 1620, and therefore the rainbow ghost that might otherwise be formed due to the reflection of external light at bottom surface 1622 as described above with respect to FIG. 16A may be reduced or minimized. For display light propagating within waveguide 1610, at least a portion of the display light may be reflected at the interface between waveguide 1610 and grating coupler 1620 due to total internal reflection and/or reflective diffraction by grating coupler 1620, and thus may not reach anti-reflective layer 1660. Some portions of the display light may be diffracted by grating coupler 1620 and may be coupled out of waveguide 1610 towards user's eyes (e.g., due to $-1^{st}$ order diffraction). Anti-reflective layer 1660 may help to reduce the reflection of the portions of the display light that are coupled out of waveguide 1610 by grating coupler 1620.

The above described techniques may be used to reduce the artifacts (e.g., rainbow ghosts) caused by a one-dimensional grating coupler, and may also be used to reduce the artifacts caused by a multi-dimensional grating coupler, such as a two-dimensional grating coupler.

In some implementations of the above described techniques or other techniques for artifact reduction (such as techniques disclosed in U.S. application Ser. No. 16/054,867, filed Aug. 3, 2018, entitled "RAINBOW REDUCTION FOR WAVEGUIDE DISPLAYS," the content of which is herein incorporated by reference for all purposes), some artifacts (including the rainbow ghosts), in particular, some artifacts caused by external light with a large incident angle, may still exist due to, for example, non-optimal design of the gratings or variations in the fabrication process.

According to certain embodiments, an angular-selective transmissive layer may be placed in front of (or behind) the waveguide and the grating coupler of a waveguide-based near-eye display to further reduce the artifacts caused by external light source. The angular-selective transmissive layer may be configured to reflect, diffract, or absorb ambient light with an incident angle greater than one half of the see-through field of view of the near-eye display, while allowing ambient light within the see-through field of view of the near-eye display to pass through and reach user's eyes with little or no loss. The angular-selective transmissive layer may include, for example, coating that may include one or more dielectric layers, diffractive elements such as gratings (e.g., meta-gratings), nanostructures (e.g., nanowires, nano-prisms, nano-pyramids), and the like.

Figure 17:
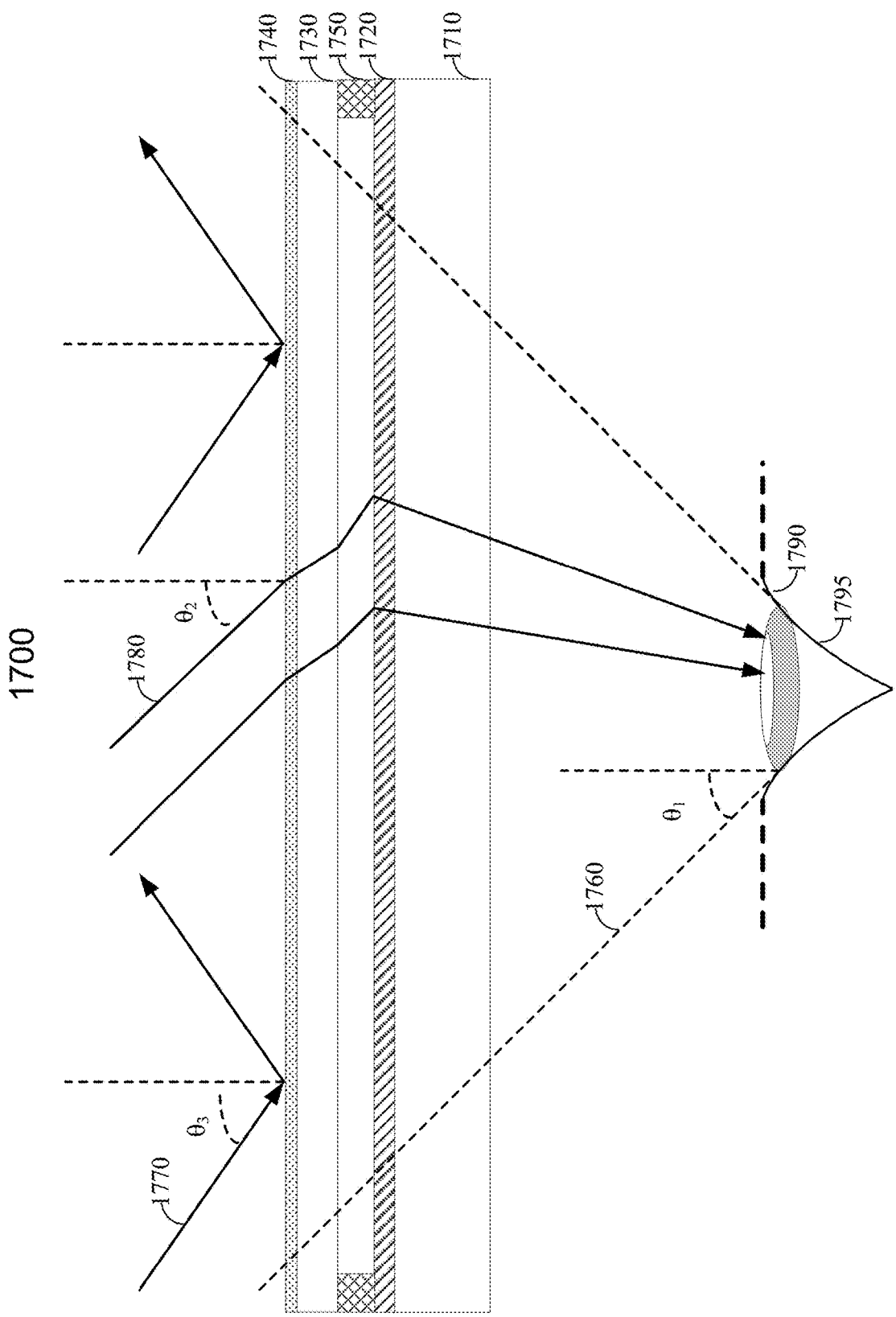
FIG. 17 illustrates an example of a waveguide display including an angular-selective transmissive layer according to certain embodiments.

FIG. 17 illustrates an example of a waveguide display 1700 including an angular-selective transmissive layer 1740 according to certain embodiments. Waveguide display 1700 may include a substrate 1710 (e.g., a waveguide) and a grating coupler layer 1720 formed on substrate 1710. Grating coupler layer 1720 may include one or more grating layers configured to reduce the artifacts as described above. For example, the grating layers may include one or more slanted gratings, the periods, heights, and the slant angles of which have a relationship as described above. In some embodiments, the grating layers may include two or more layers of gratings that may be offset with respect to each other, where the two or more layers of gratings may or may not be slanted and ambient light diffracted by the one layer of gratings may destructively interfere with ambient light diffracted by another layer of gratings, as described in U.S. application Ser. No. 16/054,867.

Waveguide display 1700 may also include an optical component 1730, which may be flat or curved. For example, optical component 1730 may include a lens, such as a vision correction lens or a lens for correcting one or more types of optical errors. In some embodiments, optical component 1730 may be attached to substrate 1710 and grating coupler layer 1720 through a spacer layer 1750. Angular-selective transmissive layer 1740 may be formed on optical component 1730. Angular-selective transmissive layer 1740 may have a high reflectivity, diffraction efficiency, or absorption for incident light with an incident angle greater than a certain threshold value, and may have a low loss for incident light with an incident angle lower than the threshold value. The threshold value may be determined based on the see-through field of view of waveguide display 1700. For example, the see-through field of view of waveguide display 1700 as shown by lines 1760 may be ±60° (totally 120°), and the threshold value may be greater than 60°, such as 65° or 70°. As such, incident light 1770 with an incident angle $\theta_3$ greater than a half of the see-through field of view (indicated by angle $\theta_1$) may be mostly reflected, diffracted, or absorbed by angular-selective transmissive layer 1740, and thus may not reach eye box 1790 or user's eye 1795. For example, angular-selective transmissive layer 1740 may reflect, diffract, or absorb at least 50%, at least 70%, at least 80%, at least 90%, at least 95%, or more of incident light 1770. Incident light 1780 with an incident angle 82 within the see-through field of view (indicated by angle $\theta_1$) may mostly pass through angular-selective transmissive layer 1740 and optical component 1730, and may be refracted by grating coupler layer 1720 and substrate 1710 towards eye box 1790 or user's eye 1795. For example, angular-selective transmissive layer 1740 may reflect, diffract, or absorb less than 30%, less than 20%, less than 10%, or less than 5% of incident light 1780. As such, artifacts caused by external light with a large incident angle may be further reduced.

In some embodiments, angular-selective transmissive layer 1740 may be on a bottom surface of optical component 1730 and may be between optical component 1730 and spacer layer 1750 (or between optical component 1730 and grating coupler layer 1720 or substrate 1710). In some embodiments, an additional angular-selective reflective layer may be position below substrate 1710.

Figure 18:
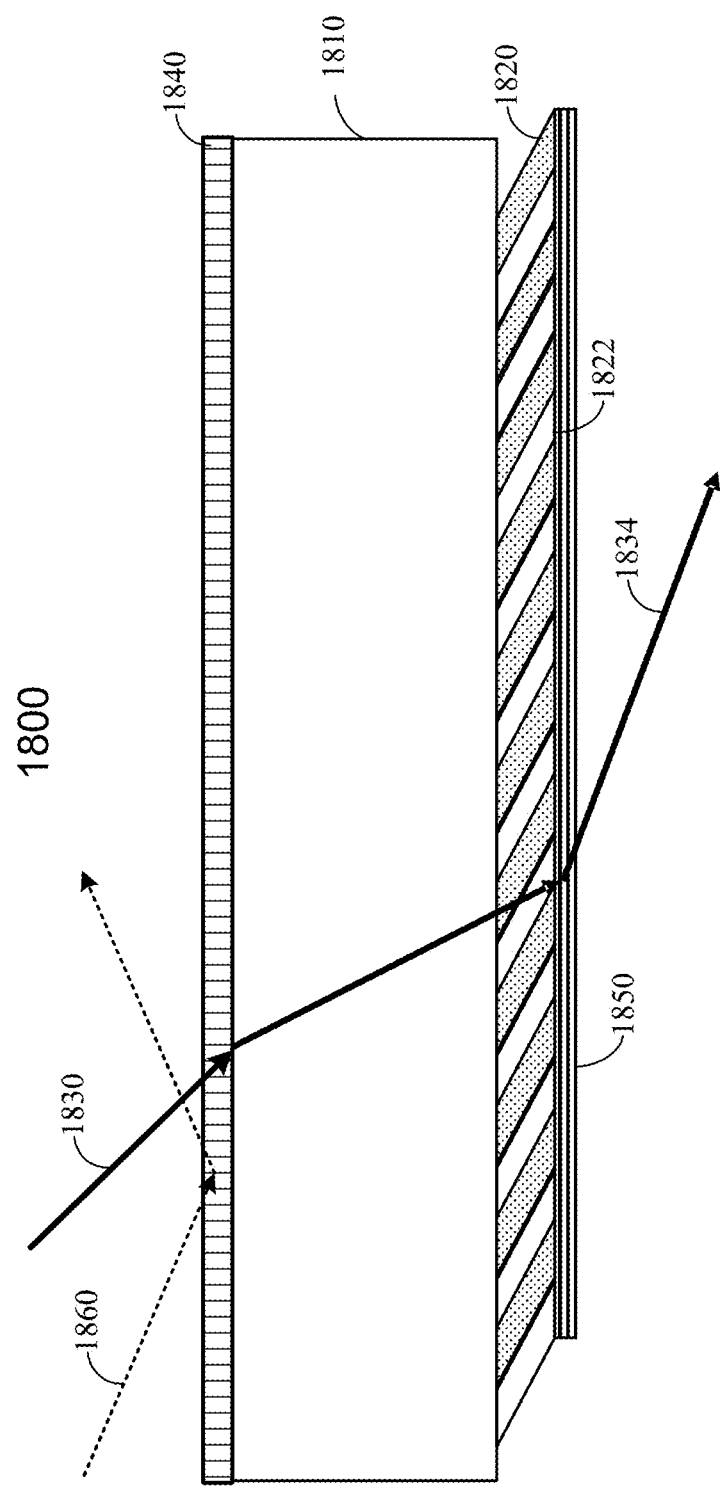
FIG. 18 illustrates an example of a waveguide display including an angular-selective transmissive layer according to certain embodiments.

FIG. 18 illustrates an example of a waveguide display 1800 including an angular-selective transmissive layer 1840 according to certain embodiments. Waveguide display 1800 may be similar to waveguide display 1600 or 1650 described above. For example, waveguide display 1800 may include a waveguide 1810 and a grating coupler 1820 at the bottom surface of waveguide 1810. Grating coupler 1820 may be similar to grating couplers 1120, 1220, 1310, 1420, 1520, and 1620 described above. External light 1830 incident on waveguide 1810 may be refracted into waveguide 1810 as external light 1832 and may then be diffracted by grating coupler 1820. The diffracted light may include a $0^{th}$ order diffraction 1834 (i.e., refractive diffraction) and a −1st order diffraction (not shown). As described above, the height, period, and slant angle of grating coupler 1820 may be configured such that the −1st order diffraction may be reduced or minimized. Waveguide display 1800 may include an additional anti-reflection layer 1850 on bottom surface 1822 of grating coupler 1820. Anti-reflection layer 1850 may include, for example, one or more dielectric thin film layers or other anti-reflection layers coated on bottom surface 1822, and may be used to reduce the reflection of the external light at bottom surface 1822. Thus, little or no external light may be reflected at bottom surface 1822 of grating coupler 1820 back to grating coupler 1820, and therefore the rainbow ghost that might otherwise be formed due to the reflection of external light at bottom surface 1822 may be reduced or minimized. For display light propagating within waveguide 1810, at least a portion of the display light may be reflected at the interface between waveguide 1810 and grating coupler 1820 due to total internal reflection and/or reflective diffraction by grating coupler 1820, and thus may not reach anti-reflection layer 1850. Some portions of the display light may be diffracted by grating coupler 1820 and may be coupled out of waveguide 1810 towards user's eyes (e.g., due to $-1^{st}$ order diffraction). Anti-reflection layer 1850 may also help to reduce the reflection of the portions of the display light that are coupled out of waveguide 1810 by grating coupler 1820.

In addition, an angular-selective transmissive layer 1840 may be coated on the top surface of waveguide 1810. Angular-selective transmissive layer 1840 may be similar to angular-selective transmissive layer 1740. Angular-selective transmissive layer 1840 may have a high reflectivity, diffraction efficiency, or absorption for incident light with an incident angle greater than a certain threshold value, and may have a low loss for incident light with an incident angle lower than the threshold value. The threshold value may be determined based on the see-through field of view of waveguide display 1800. For example, incident light 1860 with an incident angle greater than the see-through field of view may be mostly reflected, diffracted, or absorbed by angular-selective transmissive layer 1840, and thus may not reach waveguide 1810. External light 1830 with an incident angle within the see-through field of view may mostly pass through angular-selective transmissive layer and waveguide 1810, and may be refracted or diffracted by grating coupler 1820.

The angular-selective transmissive layer described above may be implemented in various ways. In some embodiments, the angular-selective transmissive layer may include one or more dielectric layers (or air gap). Each dielectric layer may have a respective refractive index. Adjacent dielectric layers may have different refractive indexes. As such, light reflection may occur at the interface between adjacent dielectric layers, where the reflectivity may depend on the incident angle as indicated by Fresnel equations:

$$R_s = \left|\frac{n_1\cos\theta_i - n_2\cos\theta_t}{n_1\cos\theta_i + n_2\cos\theta_t}\right|^2 = \left|\frac{n_1\cos\theta_i - n_2\sqrt{1-\left(\frac{n_1}{n_2}\sin\theta_i\right)^2}}{n_1\cos\theta_i + n_2\sqrt{1-\left(\frac{n_1}{n_2}\sin\theta_i\right)^2}}\right|^2,$$

and $$R_p = \left|\frac{n_1\cos\theta_t - n_2\cos\theta_i}{n_1\cos\theta_t + n_2\cos\theta_i}\right|^2 = \left|\frac{n_1\sqrt{1-\left(\frac{n_1}{n_2}\sin\theta_i\right)^2} - n_2\cos\theta_i}{n_1\sqrt{1-\left(\frac{n_1}{n_2}\sin\theta_i\right)^2} + n_2\cos\theta_i}\right|^2.$$

$R_s$ and $R_p$ are the reflectivity for s-polarized light and p-polarized light, respectively, as a function of incident angle $\theta_i$. $n_1$ and $n_2$ are the refractive indexes of adjacent dielectric layers. $\theta_t$ is the refraction angle.

Figure 19:
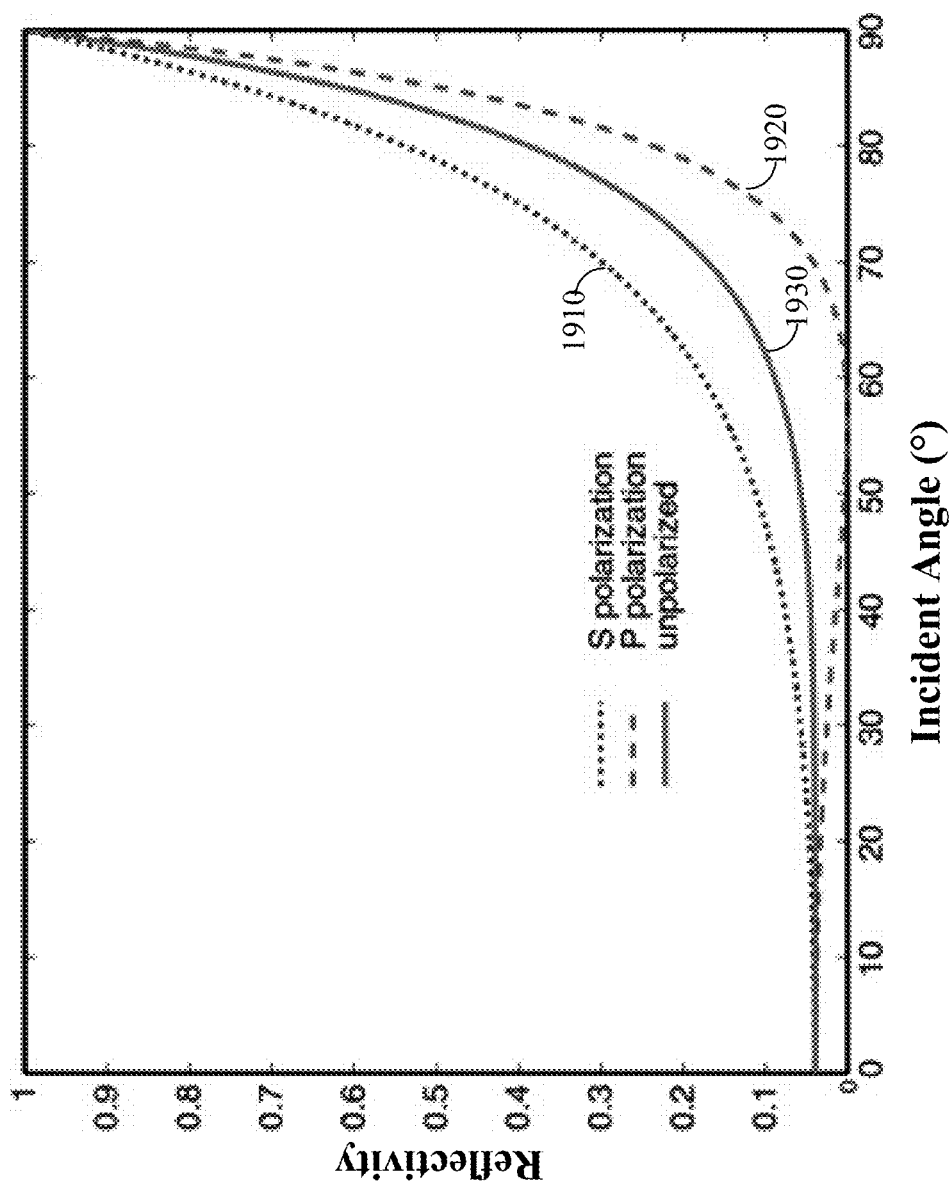
FIG. 19 illustrates reflectivity at an example of an interface between two dielectric layers as a function of the incident angle.

FIG. 19 illustrates the reflectivity at an example of an interface between two dielectric layers (e.g., between air and a glass substrate) as a function of the incident angle. FIG. 19 shows the reflectivity of s-polarized wave (shown by a curve 1910), the reflectivity of p-polarized wave (shown by a curve 1920), and the reflectivity of unpolarized wave (shown by a curve 1930) as a function of the incident angle. As illustrated, the reflectivity increases when the incident angle increases. The overall reflectivity of multiple dielectric layers may have a larger slope with respect to the incident angle at a large incident angle, such as 70° or larger.

In some embodiments, the angular-selective transmissive layer may include, for example, micro mirrors or prisms, grating, meta-gratings, nanowires, or other micro- or nano-structures. In some examples, the angular-selective transmissive layer may include gratings (e.g., surface relief gratings or holographic gratings) with small grating periods formed on a substrate (e.g., waveguide 1810 or optical component 1730). The gratings may only diffract light with large incidence angles (e.g., about 75° to about 90°) and the diffracted light may propagate in directions such that the diffracted light may not reach the eyebox. The grating period may be, for example, less than 300 nm (e.g., about 200 nm) such that the angular-selective transmissive layer may not affect light within the see-through field of view.

In some examples, the angular-selective transmissive layer may include micro-scale or nano-scale anisotropic structures that may reflect, diffract, or absorb incident light with large incident angles. The anisotropic structures may include, for example, large-aspect-ratio nanoparticles aligned and immersed in transparent media, nanowire arrays, certain liquid crystal materials, and the like.

Figure 20A:
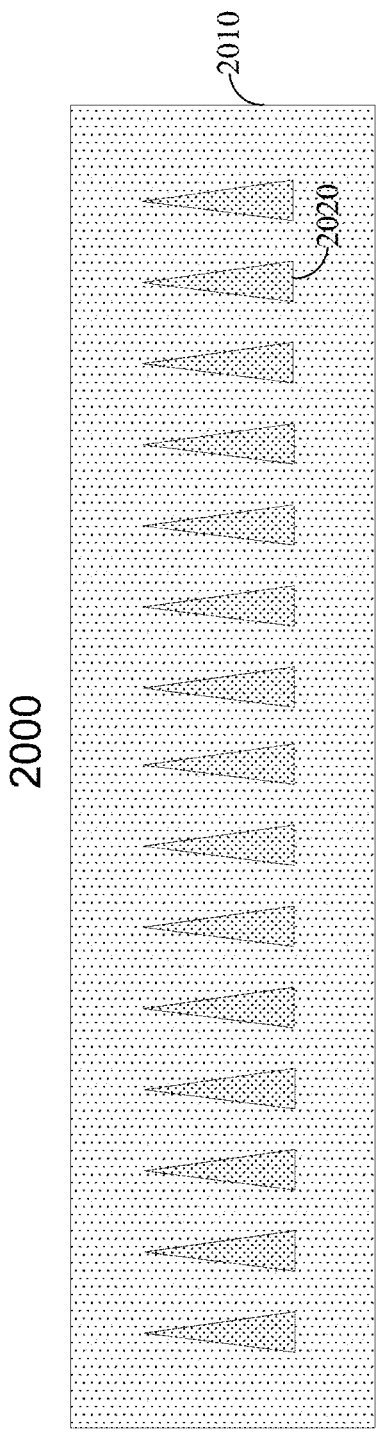
FIG. 20A illustrates an example of an angular-selective transmissive film according to certain embodiments.

FIG. 20A illustrates an example of an angular-selective transmissive film 2000 according to certain embodiments. Angular-selective transmissive film 2000 may include micro- or nano-structures or particles immersed in a transparent material. The micro- or nano-structures may include, for example, nanowires (e.g., semiconductor or ZnO nanowires), micro-prisms, or micro-pyramids, that may reflect, diffract, and/or absorb incident light having large incident angles. The transparent material may include, for example, glass, polycarbonate, or plastic (e.g., polyester). The angular selectivity of angular-selective transmissive film 2000 may be adjusted by changing, for example, the aspect ratio, separation, shape, and the like of the micro- or nano-structures or particles.

Figure 20B:
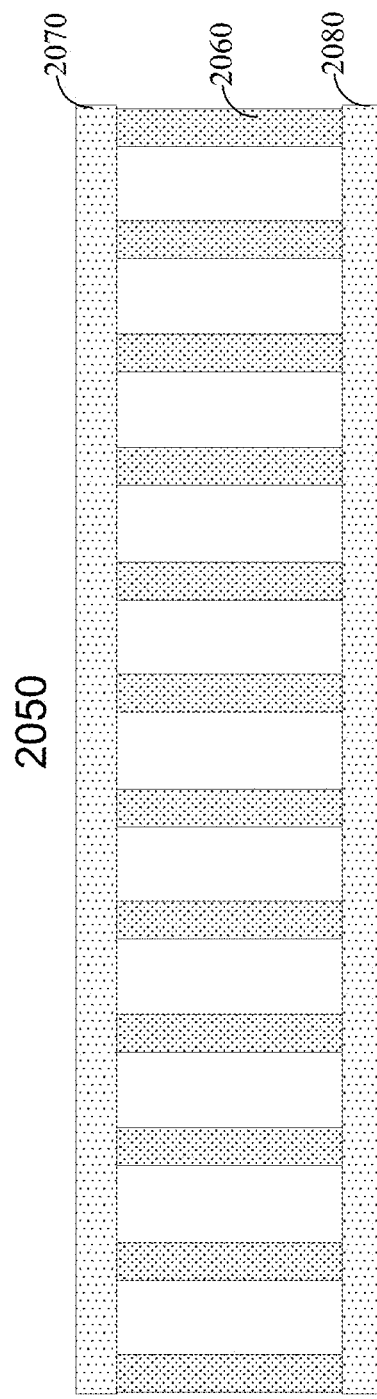
FIG. 20B illustrates an example of an angular-selective transmissive film according to certain embodiments.

FIG. 20B illustrates an example of an angular-selective transmissive film 2050 according to certain embodiments. Angular-selective transmissive film 2000 may include a microlouver layer 2060 sandwiched by two transparent layers 2070 and 2080. Microlouver layer 2060 may include microscopic louvers made of, for example, transparent silicone rubber. Transparent layers 2070 and 2080 may include, for example, polyester, polycarbonate, glass, and the like. The angular selectivity of angular-selective transmissive film 2050 may be adjusted by changing, for example, the aspect ratio, separation, shape, and the like of the microscopic louvers.

In some circumstances, it may be desirable that the angular-selective transmissive layer described above is anisotropic at each region such that the angular-selective transmissive layer may direct incident light with opposite incident angles differently. For example, it may be desirable that the angular-selective transmissive layer at a certain region allows incident light with an incident angle α (which may not cause rainbow or other artifacts) to pass through, while blocking (reflect, diffract, or absorb) incident light with an incident angle −α (which may cause rainbow or other artifacts). In some cases, it may be desirable that the angular-selective transmissive layer described above has different angular selective characteristics at different regions. For example, it may be desirable that the angular-selective transmissive layer at two opposite regions with respect to the center of the angular-selective transmissive layer have opposite angular selective characteristics. In some embodiments, the different angular selective characteristics at different regions may be achieved by, for example, gratings with different grating parameters at the different regions.

Figure 21:
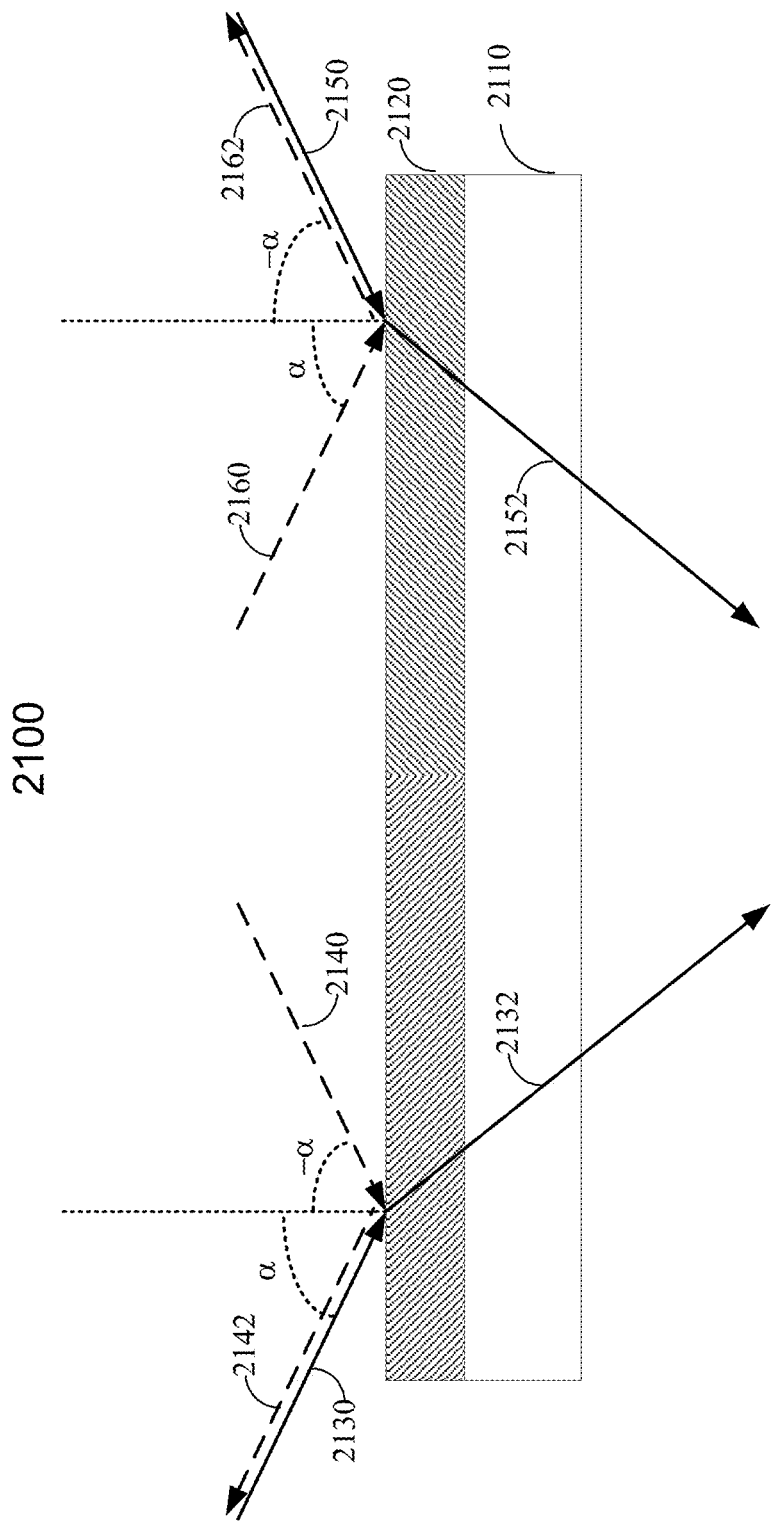
FIG. 21 illustrates an example of an angular-selective transmissive layer according to certain embodiments.

FIG. 21 illustrates an example of an angular-selective transmissive layer 2120 according to certain embodiments. As described above, angular-selective transmissive layer 2120 may be formed on any surface of any substrate, such as on a top surface of a substrate 2110, which may be, for example, a display waveguide, a lens, or a support plate. Angular-selective transmissive layer 2120 may have different angular selective characteristics at different regions and may also have anisotropic angular selective characteristics at each region.

For example, as illustrated in the example, light 2130 incident at an incident angle α on a left region of angular-selective transmissive layer 2120 may be transmitted (e.g., refracted) by angular-selective transmissive layer 2120 as shown by refracted light 2132. On the other hand, light 2140 incident at an incident angle −α on the same region of angular-selective transmissive layer 2120 may be blocked (e.g., diffracted, reflected, or absorbed) by angular-selective transmissive layer 2120 as shown by light 2142.

As also illustrated in the example, light 2150 incident at an incident angle −α on a right region of angular-selective transmissive layer 2120 may be transmitted (e.g., refracted) by angular-selective transmissive layer 2120 as shown by refracted light 2152. On the other hand, light 2160 incident at an incident angle α on the same region of angular-selective transmissive layer 2120 may be blocked (e.g., diffracted, reflected, or absorbed) by angular-selective transmissive layer 2120 as shown by light 2162.

In some embodiments, different regions of angular-selective transmissive layer 2120 may be configured to block incident light within different incident angle ranges. For example, one region of angular-selective transmissive layer 2120 may be configured to block incident light with incident angles greater than 70° (or less than −70°), while a different region of angular-selective transmissive layer 2120 may be configured to block incident light with incident angles greater than 60° (or less than −60°).

Embodiments of the invention may include or be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 22:
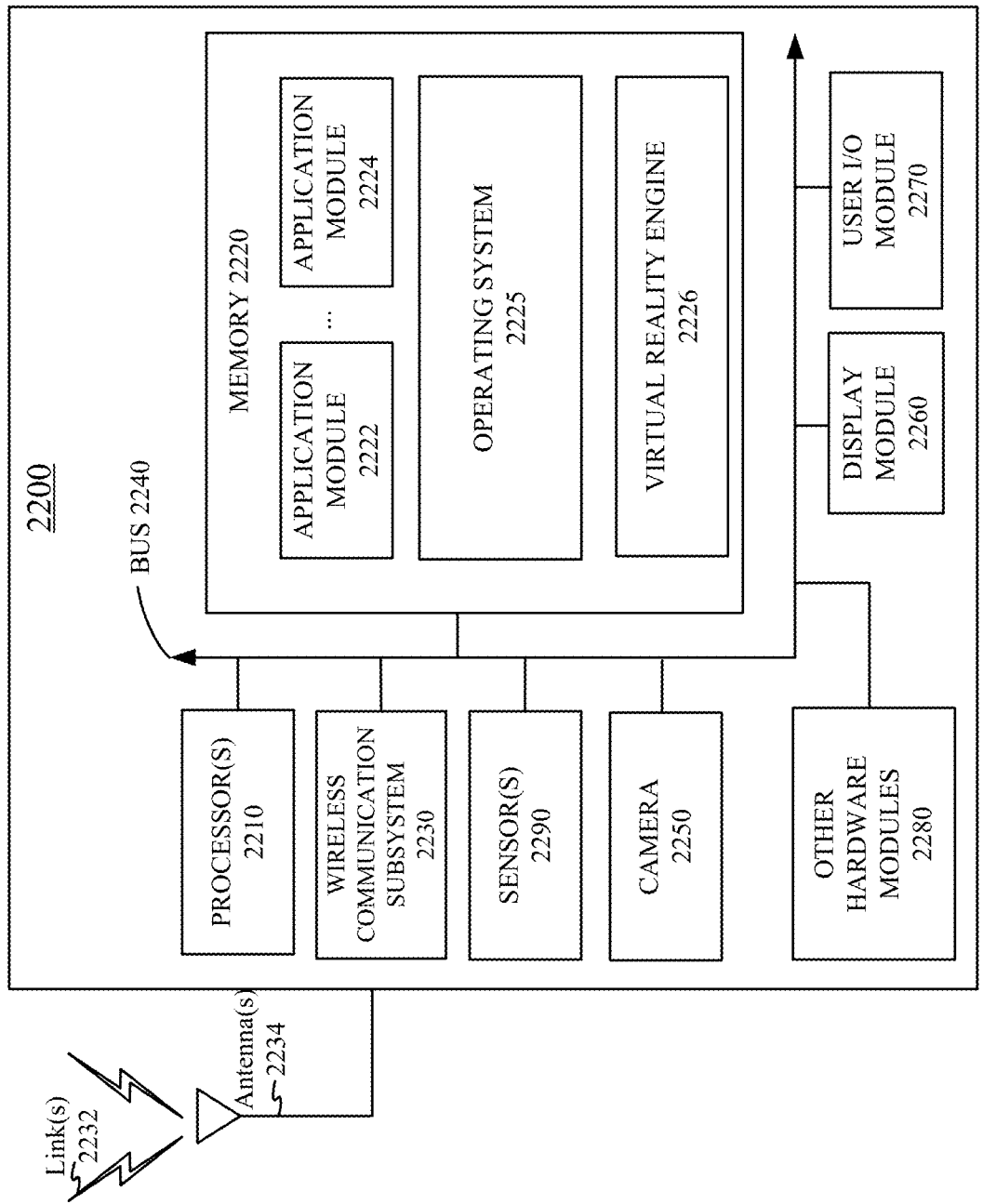
FIG. 22 is a simplified block diagram of an example electronic system of an example near-eye display for implementing some of the examples disclosed herein.

FIG. 22 is a simplified block diagram of an example electronic system 2200 of an example near-eye display (e.g., HMD device) for implementing some of the examples disclosed herein. Electronic system 2200 may be used as the electronic system of an HMD device or other near-eye displays described above. In this example, electronic system 2200 may include one or more processor(s) 2210 and a memory 2220. Processor(s) 2210 may be configured to execute instructions for performing operations at a number of components, and can be, for example, a general-purpose processor or microprocessor suitable for implementation within a portable electronic device. Processor(s) 2210 may be communicatively coupled with a plurality of components within electronic system 2200. To realize this communicative coupling, processor(s) 2210 may communicate with the other illustrated components across a bus 2240. Bus 2240 may be any subsystem adapted to transfer data within electronic system 2200. Bus 2240 may include a plurality of computer buses and additional circuitry to transfer data.

Memory 2220 may be coupled to processor(s) 2210. In some embodiments, memory 2220 may offer both short-term and long-term storage and may be divided into several units. Memory 2220 may be volatile, such as static random access memory (SRAM) and/or dynamic random access memory (DRAM) and/or non-volatile, such as read-only memory (ROM), flash memory, and the like. Furthermore, memory 2220 may include removable storage devices, such as secure digital (SD) cards. Memory 2220 may provide storage of computer-readable instructions, data structures, program modules, and other data for electronic system 2200. In some embodiments, memory 2220 may be distributed into different hardware modules. A set of instructions and/or code might be stored on memory 2220. The instructions might take the form of executable code that may be executable by electronic system 2200, and/or might take the form of source and/or installable code, which, upon compilation and/or installation on electronic system 2200 (e.g., using any of a variety of generally available compilers, installation programs, compression/decompression utilities, etc.), may take the form of executable code.

In some embodiments, memory 2220 may store a plurality of application modules 2222 through 2224, which may include any number of applications. Examples of applications may include gaming applications, conferencing applications, video playback applications, or other suitable applications. The applications may include a depth sensing function or eye tracking function. Application modules 2222-2224 may include particular instructions to be executed by processor(s) 2210. In some embodiments, certain applications or parts of application modules 2222-2224 may be executable by other hardware modules 2280. In certain embodiments, memory 2220 may additionally include secure memory, which may include additional security controls to prevent copying or other unauthorized access to secure information.

In some embodiments, memory 2220 may include an operating system 2225 loaded therein. Operating system 2225 may be operable to initiate the execution of the instructions provided by application modules 2222-2224 and/or manage other hardware modules 2280 as well as interfaces with a wireless communication subsystem 2230 which may include one or more wireless transceivers. Operating system 2225 may be adapted to perform other operations across the components of electronic system 2200 including threading, resource management, data storage control and other similar functionality.

Wireless communication subsystem 2230 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 2200 may include one or more antennas 2234 for wireless communication as part of wireless communication subsystem 2230 or as a separate component coupled to any portion of the system. Depending on desired functionality, wireless communication subsystem 2230 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 2230 may permit data to be exchanged with a network, other computer systems, and/or any other devices described herein. Wireless communication subsystem 2230 may include a means for transmitting or receiving data, such as identifiers of HMD devices, position data, a geographic map, a heat map, photos, or videos, using antenna(s) 2234 and wireless link(s) 2232. Wireless communication subsystem 2230, processor(s) 2210, and memory 2220 may together comprise at least a part of one or more of a means for performing some functions disclosed herein.

Embodiments of electronic system 2200 may also include one or more sensors 2290. Sensor(s) 2290 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 2290 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 2200 may include a display module 2260. Display module 2260 may be a near-eye display, and may graphically present information, such as images, videos, and various instructions, from electronic system 2200 to a user. Such information may be derived from one or more application modules 2222-2224, virtual reality engine 2226, one or more other hardware modules 2280, a combination thereof, or any other suitable means for resolving graphical content for the user (e.g., by operating system 2225). Display module 2260 may use liquid crystal display (LCD) technology, light-emitting diode (LED) technology (including, for example, OLED, ILED, mLED, AMOLED, TOLED, etc.), light emitting polymer display (LPD) technology, or some other display technology.

Electronic system 2200 may include a user input/output module 2270. User input/output module 2270 may allow a user to send action requests to electronic system 2200. An action request may be a request to perform a particular action. For example, an action request may be to start or end an application or to perform a particular action within the application. User input/output module 2270 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 2200. In some embodiments, user input/output module 2270 may provide haptic feedback to the user in accordance with instructions received from electronic system 2200. For example, the haptic feedback may be provided when an action request is received or has been performed.

Electronic system 2200 may include a camera 2250 that may be used to take photos or videos of a user, for example, for tracking the user's eye position. Camera 2250 may also be used to take photos or videos of the environment, for example, for VR, AR, or MR applications. Camera 2250 may include, for example, a complementary metal-oxide-semiconductor (CMOS) image sensor with a few millions or tens of millions of pixels. In some implementations, camera 2250 may include two or more cameras that may be used to capture 3-D images.

In some embodiments, electronic system 2200 may include a plurality of other hardware modules 2280. Each of other hardware modules 2280 may be a physical module within electronic system 2200. While each of other hardware modules 2280 may be permanently configured as a structure, some of other hardware modules 2280 may be temporarily configured to perform specific functions or temporarily activated. Examples of other hardware modules 2280 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 2280 may be implemented in software.

In some embodiments, memory 2220 of electronic system 2200 may also store a virtual reality engine 2226. Virtual reality engine 2226 may execute applications within electronic system 2200 and receive position information, acceleration information, velocity information, predicted future positions, or some combination thereof of the HMD device from the various sensors. In some embodiments, the information received by virtual reality engine 2226 may be used for producing a signal (e.g., display instructions) to display module 2260. For example, if the received information indicates that the user has looked to the left, virtual reality engine 2226 may generate content for the HMD device that mirrors the user's movement in a virtual environment. Additionally, virtual reality engine 2226 may perform an action within an application in response to an action request received from user input/output module 2270 and provide feedback to the user. The provided feedback may be visual, audible, or haptic feedback. In some implementations, processor(s) 2210 may include one or more GPUs that may execute virtual reality engine 2226.

In various implementations, the above-described hardware and modules may be implemented on a single device or on multiple devices that can communicate with one another using wired or wireless connections. For example, in some implementations, some components or modules, such as GPUs, virtual reality engine 2226, and applications (e.g., tracking application), may be implemented on a console separate from the head-mounted display device. In some implementations, one console may be connected to or support more than one HMD.

In alternative configurations, different and/or additional components may be included in electronic system 2200. Similarly, functionality of one or more of the components can be distributed among the components in a manner different from the manner described above. For example, in some embodiments, electronic system 2200 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A waveguide display comprising:
   a first substrate including a first surface;
   one or more grating layers on the first surface of the first substrate, the one or more grating layers configured to cause destructive interference between ambient light diffracted by at least two grating layers or between ambient light diffracted by different portions of one grating layer; and
   an angular-selective transmissive layer configured to reflect, diffract, or absorb ambient light incident on the angular-selective transmissive layer with an incidence angle greater than a threshold value.

2. The waveguide display of claim 1, wherein the one or more grating layers include:
   a slanted grating including a plurality of slanted ridges, the slanted grating characterized by a height, a period, and a slant angle of the plurality of slanted ridges configured to cause destructive interference between ambient light diffracted by different portions of the slanted grating; or
   at least two grating layers, wherein the at least two grating layers are characterized by a same grating period and are offset by a half of the grating period.

3. The waveguide display of claim 1, wherein:
   the first substrate is configured to guide display light within the first substrate through total internal reflection; and
   the one or more grating layers are configured to:
   diffract the display light out of the first substrate; and
   refract the ambient light.

4. The waveguide display of claim 1, wherein the angular-selective transmissive layer comprises:
   a plurality of absorptive or reflective layers arranged in a stack;
   a layer of subwavelength structures;
   a grating layer characterized by a subwavelength grating period; or
   a microlouver layer.

5. The waveguide display of claim 1, wherein:
   the waveguide display is characterized by a see-through field of view; and
   the threshold value is equal to or greater than a half of the see-through field of view.

6. The waveguide display of claim 1, wherein the threshold value is greater than 60°.

7. The waveguide display of claim 1, wherein a reflectivity, diffraction efficiency, or absorptivity of the angular-selective transmissive layer for ambient light with the incidence angle greater than the threshold value is greater than 90%.

8. The waveguide display of claim 1, wherein the angular-selective transmissive layer is on a second surface of the first substrate that is opposite to the first surface.

9. The waveguide display of claim 1, further comprising a second substrate, wherein the angular-selective transmissive layer is on a surface of the second substrate.

10. The waveguide display of claim 9, wherein the second substrate includes a lens.

11. The waveguide display of claim 1, wherein the angular-selective transmissive layer includes a plurality of regions, each region characterized by a different respective angular selectivity.

12. The waveguide display of claim 11, wherein each region of the plurality of regions is configured to reflect, diffract, or absorb ambient light with incidence angles within a different respective angular range.

13. The waveguide display of claim 11, wherein each region of the plurality of regions is configured to transmit ambient light with a first incident angle $\alpha$ and block ambient light with a second incident angle $-\alpha$.

14. A near-eye display comprising:
   a waveguide;
   an input coupler configured to couple display light from an image source into the waveguide;
   an output coupler coupled to the waveguide and configured to:
   refractively transmit ambient light from an environment in front of the near-eye display; and
   diffractively couple the display light out of the waveguide; and
   an angular-selective transmissive layer, the angular-selective transmissive layer configured to reflect, diffract, or absorb ambient light incident on the angular-selective transmissive layer with an incidence angle greater than a threshold value,
   wherein the output coupler comprises one or more grating layers and is configured to cause destructive interference between ambient light diffracted by at least two grating layers or between ambient light diffracted by different portions of one grating layer.

15. The near-eye display of claim 14, wherein the one or more grating layers include:
   a slanted grating including a plurality of slanted ridges, the slanted grating characterized by a height, a period, and a slant angle of the plurality of slanted ridges configured to cause destructive interference between ambient light diffracted by different portions of the slanted grating; or
   at least two grating layers, wherein the at least two grating layers are characterized by a same grating period and are offset by a half of the grating period.

16. The near-eye display of claim 14, wherein the angular-selective transmissive layer comprises:
   a plurality of absorptive or reflective layers arranged in a stack;

a layer of subwavelength structures;

a grating layer characterized by a subwavelength grating period; or a microlouver layer.

17. The near-eye display of claim 14, wherein:

the near-eye display is characterized by a see-through field of view; and the threshold value is equal to or greater than a half of the see-through field of view.

18. The near-eye display of claim 14, wherein a reflectivity, diffraction efficiency, or absorptivity of the angular-selective transmissive layer for ambient light with the incidence angle greater than the threshold value is greater than 90%.

19. The near-eye display of claim 14, wherein the threshold value is greater than 60°.

20. The near-eye display of claim 14, wherein the angular-selective transmissive layer is on a surface of the waveguide.

21. The near-eye display of claim 14, further comprising a substrate, wherein the angular-selective transmissive layer is on a surface of the substrate.

* * * * *